US012330838B2

(12) United States Patent
Daniels et al.

(10) Patent No.: US 12,330,838 B2
(45) Date of Patent: Jun. 17, 2025

(54) LOCKABLE SHELVES AND METHODS

(71) Applicant: Bell and Howell, LLC, Durham, NC (US)

(72) Inventors: Mahlon Tucker Daniels, Holly Springs, NC (US); Richard Daniel Johnson, Fuquay Varina, NC (US)

(73) Assignee: Bell and Howell, LLC, Durham, NC (US)

( * ) Notice: Subject to any disclaimer, the term of this patent is extended or adjusted under 35 U.S.C. 154(b) by 372 days.

(21) Appl. No.: 17/837,323

(22) Filed: Jun. 10, 2022

(65) Prior Publication Data

US 2022/0396396 A1    Dec. 15, 2022

Related U.S. Application Data

(60) Provisional application No. 63/210,758, filed on Jun. 15, 2021.

(51) Int. Cl.
*B65D 21/02* (2006.01)
*B65D 25/04* (2006.01)
*G06Q 10/0836* (2023.01)

(52) U.S. Cl.
CPC ......... *B65D 21/0204* (2013.01); *B65D 25/04* (2013.01); *G06Q 10/0836* (2013.01)

(58) Field of Classification Search
CPC .............................................. B65D 21/0204
See application file for complete search history.

(56) References Cited

U.S. PATENT DOCUMENTS

| 5,287,980 | A | * | 2/1994 | Saltz | B65D 21/0204 |
| | | | | | 220/636 |
| 7,690,856 | B2 | * | 4/2010 | Mortensen | A01K 61/54 |
| | | | | | 220/4.27 |
| 9,242,810 | B2 | | 1/2016 | Lossov et al. | |
| 10,376,445 | B2 | * | 8/2019 | Knobel | B65D 21/083 |
| 10,815,056 | B2 | * | 10/2020 | Kropp | G06Q 10/08 |

(Continued)

FOREIGN PATENT DOCUMENTS

BE    900 160 A    1/1985

OTHER PUBLICATIONS

European Search Report for Application No. 22178840 dated Oct. 28, 2022.

(Continued)

*Primary Examiner* — Jonathan Snelting
(74) *Attorney, Agent, or Firm* — KDW Firm PLLC

(57) ABSTRACT

A self-locking assembly includes one or more shelves. Each of the shelves has dividers, which define storage bays that are adjacent to each other in a lateral direction and adjacent storage bays being spaced apart from each other by one of the dividers positioned therebetween, and a lock contained within each storage bay. The self-locking assembly also includes one or more storage units having a width that is a same as, or smaller than, a width of at least one of the storage bays. Each of the storage units has an upper surface, which transports item(s) supported thereon, and an interlocking feature that engages with the lock of one of the storage bays to resist removal of each storage unit from a corresponding one of the storage bays. Each storage unit can be inserted into and removed from a corresponding one of the storage bays in a longitudinal direction.

20 Claims, 16 Drawing Sheets

(56) References Cited

U.S. PATENT DOCUMENTS

| | | | |
|---|---|---|---|
| 10,934,093 B2 | 3/2021 | Gil | |
| 2014/0263112 A1* | 9/2014 | Bird | A47F 7/285 |
| | | | 49/386 |
| 2019/0225371 A1* | 7/2019 | Hoppe | B25H 3/023 |
| 2020/0256507 A1* | 8/2020 | Isobe | F16M 11/22 |
| 2021/0031975 A1* | 2/2021 | Brunner | B62B 3/02 |

OTHER PUBLICATIONS

European Intention to Grant for EP Application No. 22178840.9, dated Dec. 12, 2024, 6 pages.

* cited by examiner

LOCKABLE SHELVES AND METHODS

CROSS-REFERENCE TO RELATED APPLICATIONS

This application claims priority to U.S. Provisional Patent Application Ser. No. 63/210,758, filed on Jun. 15, 2021, the disclosure of which is incorporated by reference herein in its entirety.

TECHNICAL FIELD

The subject matter disclosed herein relates generally to automated storage and retrieval systems and methods. More particularly, the subject matter disclosed herein relates to automated storage and retrieval systems and methods configured for use in mobile settings, including towable and/or motorized devices and settings.

BACKGROUND

With the increased use of ecommerce and online ordering and parcel or package delivery, more parcels and packages are being delivered than ever before. As more parcels and packages are being delivered via parcel or package delivery trucks, the delivery trucks need to be more efficient in order to keep up with parcel delivery demand to ensure service and delivery times are met.

In today's parcel delivery trucks, parcels are loaded using a zone order that is based on the predetermined delivery route of the delivery truck. The first delivery parcels are placed in the front zone of the truck and the last parcel is placed in the back zone. This requires the loaders to load the truck in proper sequence, so the driver does not have to search for a parcel or package. This method puts a burden on the loading labor, often requiring the driver to adjust parcel placement during the delivery process as well. This ultimately causes extra time during the delivery and leads to higher costs and higher delivery times.

These problems are not exclusive to parcel delivery trucks. They are also present in warehouses, pickup and delivery locations, retail settings, and many other environments. Therefore, there is a need for more efficient automated storage and retrieval systems and methods to reduce the time and cost associated with customer parcel delivery and/or pick-up.

SUMMARY

In accordance with this disclosure, automated storage and retrieval systems and methods are provided. In one aspect, an automated storage and retrieval system comprises an area configured for holding one or more parcels, a parcel inductor configured to receive and induct the one or more parcels, a parcel conveyor configured to convey the one or more parcels to locations within the area; and a parcel extraction station configured such that, when a parcel is ready to be extracted from the area, the parcel conveyor is configured to deliver the parcel to the parcel extraction station, which is configured such that a user can extract the parcel from the area.

According to an example embodiment, a self-locking assembly is provided, the self-locking assembly comprising: one or more shelves comprising: dividers to define storage bays that are adjacent to each other in a lateral direction and adjacent storage bays being spaced apart from each other by one of the dividers positioned therebetween, and a lock contained within each storage bay; and one or more storage units having a width that is a same as, or smaller than, a width of at least one of the storage bays, each of the one or more storage units comprising: an upper surface configured to transport one or more items supported thereon, and an interlocking feature configured to engage with the lock of one of the storage bays to resist removal of each storage unit from a corresponding one of the storage bays; wherein each storage unit is configured for insertion within and removal from a corresponding one of the storage bays in a longitudinal direction.

In some or all embodiments of the self-locking assembly, the lock comprises a protrusion installed adjacent to and in contact with one of the dividers, each protrusion extending within a corresponding storage bay in which the protrusion is installed in the longitudinal direction; and the interlocking feature comprises a recess formed on a lateral edge of the storage unit, the recess having a substantially similar shape to the protrusion, so that the protrusion is configured to fit, partially or entirely, within the recess.

In some or all embodiments of the self-locking assembly, the protrusion is a first protrusion; each lock comprises a second protrusion, which is installed adjacent to and in contact with one of the dividers on an opposite side of each storage bay from the first protrusion; the recess is a first recess; and the interlocking feature comprises a second recess formed on a lateral edge of the storage unit, the second recess having a substantially similar shape to the second protrusion, so that the second protrusion is configured to fit, partially or entirely, within the second recess.

In some or all embodiments of the self-locking assembly, each storage bay comprises, at a front and/or rear edge thereof as defined in the longitudinal direction, one or more front walls and/or rear walls, respectively, which are configured to resist a movement of any storage unit, relative to the storage bay, in the longitudinal direction when the interlocking feature is engaged with the lock, unless the storage bay is lifted vertically over the one or more front walls at the front edge of the storage bay.

In some or all embodiments of the self-locking assembly, the first and second protrusions each have a substantially planar top surface having a height that is the same as or higher than a height of the one or more vertical walls; and each of the first and second protrusions comprise a sloped surface at a rear edge thereof.

In some or all embodiments, the self-locking assembly comprises a transport system configured to: deposit one of the storage units within a corresponding one of the storage bays; and remove one of the storage units from the corresponding one of the storage bays; wherein each storage unit comprises a movement feature configured for engagement with the transport system for depositing or removing one of the storage units from the corresponding one of the storage bays.

In some or all embodiments of the self-locking assembly, the transport system is configured such that, when depositing one of the storage units within one of the storage bays, a bottom surface of the storage unit is at a height above, or a same as, the height of the one or more front walls at the front edge of the storage bay, such that the bottom surface of the storage unit is in sliding contact with the top surface of each of the first and second protrusions as the storage unit is deposited into the corresponding storage bay.

In some or all embodiments of the self-locking assembly, when one of the storage units is being deposited into one of the storage bays, the bottom surface of the storage unit is configured to slide down the sloped surface of each of the first and second protrusions, such that the bottom surface of the storage unit is at a height below the one or more front walls at the front edge of the storage bay; and/or when one of the storage units is being retrieved from one of the storage bays, the bottom surface of the storage unit is configured to slide up the sloped surface of each of the first and second protrusions, such that the bottom surface of the storage unit is at a same height as the one or more front walls at the front edge of the storage bay.

In some or all embodiments of the self-locking assembly, the transport system is configured to: when depositing one of the storage units within the storage bay and after a front edge of the storage unit has passed over the one or more front walls at the front edge of the storage bay, lower the front edge of the storage unit such that substantially all of the first and second recesses are occupied by at least portions of the first and second protrusions, respectively; and when removing one of the storage units from one of the storage bays, engage with the movement feature to lift a front edge of the bottom surface of the storage unit to a height above, or a same as, the height of the one or more front walls at the front edge of the storage bay, and to pull the storage unit out of the storage bay.

In some or all embodiments of the self-locking assembly, each storage unit comprises a wall extending vertically upward from the upper surface to resist items positioned on the upper surface from sliding off of the storage unit; and/or the lateral direction is substantially orthogonal to the lateral direction, and wherein a gravity vector is substantially orthogonal to both the lateral direction and the longitudinal direction.

According to an example embodiment, a conveyance is provided, the conveyance comprising at least one self-locking assembly according to any of the embodiments provided herein.

In some or all embodiments of the conveyance, the conveyance is a motor vehicle for delivering parcels, packages, and/or mail.

According to an example embodiment, a method of securing a storage unit within a storage bay is provided, the method comprising: providing one or more shelves, each of which comprises: dividers to define storage bays that are adjacent to each other in a lateral direction and adjacent storage bays being spaced apart from each other by one of the dividers positioned therebetween, and a lock contained within each storage bay; providing one or more storage units having a width that is a same as, or smaller than, a width of at least one of the storage bays, each of the one or more storage units comprising: an upper surface for transporting one or more items supported thereon; and an interlocking feature that engages with the lock of one of the storage bays to resist removal of each storage unit from a corresponding one of the storage bays; and moving one of the storage units into and/or out of a corresponding one of the storage bays in a longitudinal direction.

In some or all embodiments of the method, the lock comprises a protrusion installed adjacent to and in contact with one of the dividers, each protrusion extending within a corresponding storage bay in which the protrusion is installed in the longitudinal direction; and the interlocking feature comprises a recess formed on a lateral edge of the storage unit, the recess having a substantially similar shape to the protrusion, so that the protrusion can fit, partially or entirely, within the recess.

In some or all embodiments of the method, the protrusion is a first protrusion; each lock comprises a second protrusion, which is installed adjacent to and in contact with one of the dividers on an opposite side of each storage bay from the first protrusion; the recess is a first recess; and the interlocking feature comprises a second recess formed on a lateral edge of the storage unit, the second recess having a substantially similar shape to the second protrusion, so that the second protrusion can fit, partially or entirely, within the second recess.

In some or all embodiments of the method, each storage bay comprises, at a front and/or rear edge thereof as defined in the longitudinal direction, one or more front walls and/or rear walls, respectively, which resist a movement of any storage unit, relative to the storage bay, in the longitudinal direction when the interlocking feature is engaged with the lock, unless the storage bay is lifted vertically over the one or more front walls at the front edge of the storage bay.

In some or all embodiments of the method, the first and second protrusions each have a substantially planar top surface having a height that is substantially similar to a height of the one or more vertical walls; and each of the first and second protrusions comprise a sloped surface at a rear edge thereof.

In some or all embodiments of the method, each storage unit comprises a movement feature; the method comprising engaging the movement feature with a transport system to deposit one of the storage units within one of the storage bays and/or to remove one of the storage units from one of the storage bays.

In some or all embodiments of the method, depositing one of the storage units within one of the storage bays comprises: raising the storage tray such that a bottom surface thereof is at a height above, or a same as, the height of the one or more front walls at the front edge of the storage bay; and as the storage unit is deposited within a corresponding one of the storage bays, sliding the bottom surface of the storage unit along the top surface of each of the first and second protrusions.

In some or all embodiments of the method, depositing one of the storage units within one of the storage bays comprises sliding the bottom surface of the storage unit down the sloped surface of each of the first and second protrusions, such that the bottom surface of the storage unit is at a height below the one or more vertical walls at the front and/or rear edges of the storage bay; and/or retrieving one of the storage units from one of the storage bays comprises sliding the bottom surface of the storage unit up the sloped surface of each of the first and second protrusions, such that the bottom surface of the storage unit is at a same height as the one or more front walls at the front edge of the storage bay.

In some or all embodiments of the method, the transport system: lowers, when depositing one of the storage units within the storage bay and after a front edge of the storage unit has passed over the one or more front walls at the front edge of the storage bay, the front edge of the storage unit such that substantially all of the first and second recesses are occupied by at least portions of the first and second protrusions, respectively; and engages, when removing one of the storage units from one of the storage bays, with the movement feature to lift a front edge of the bottom surface of the storage unit to a height above, or a same as, the height of the one or more front walls at the front edge of the storage bay, and to pull the storage unit out of the storage bay.

In some or all embodiments of the method, each storage unit comprises a wall extending vertically upward from the upper surface to resist items positioned on the upper surface from sliding off of the storage unit; and/or the lateral direction is substantially orthogonal to the longitudinal direction, and wherein a gravity vector is substantially orthogonal to both the lateral direction and the longitudinal direction.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

DETAILED DESCRIPTION

Figure 1:
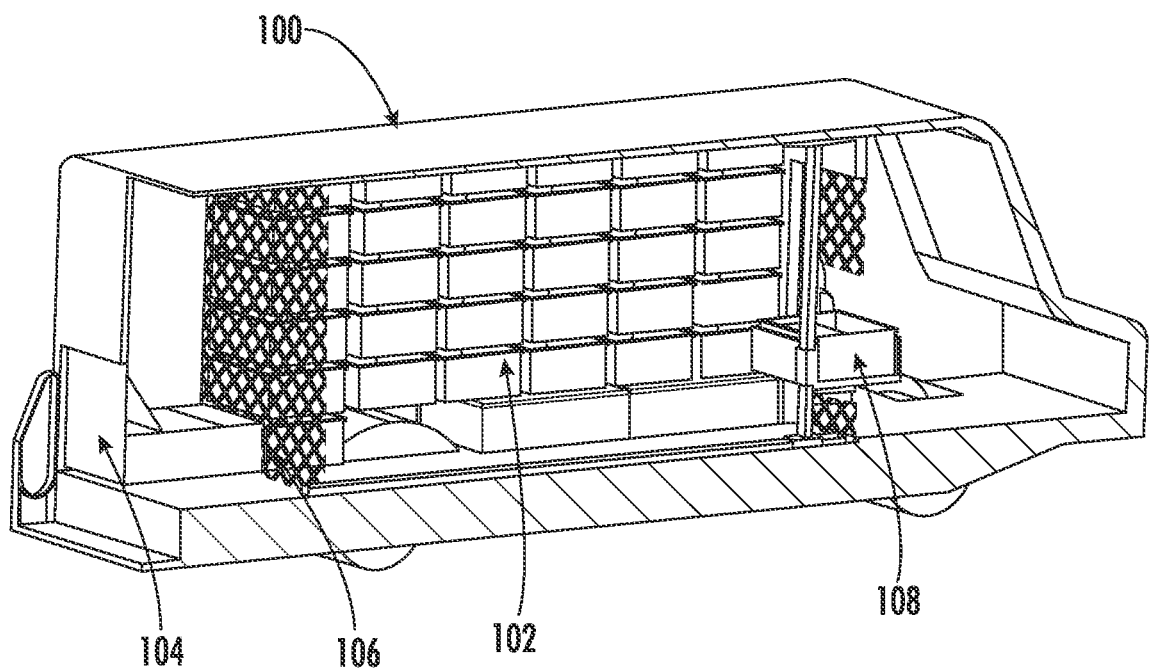
FIG. 1 is a cross-sectional view of an example embodiment of a vehicle, in which is arranged an example embodiment of an automated storage and retrieval system (ASRS).

The present subject matter provides example embodiments of automated storage and retrieval systems and methods. In one aspect, the present subject matter provides an automated storage and retrieval system configured to allow a user to efficiently store and retrieve parcels in/from an area. As used herein, the term "parcel" is used to refer to any conveyable goods, including, for example and without limitation, durable goods, perishable goods, pharmaceuticals, parcels, letters, and the like. Referring to FIG. 1, which illustrates an inside view of a delivery truck comprising an example automated storage and retrieval system 100 according to some embodiments of the present disclosure. For example and without limitation, the automated storage and retrieval system 100 can be configured to operate on a vehicle, such as a delivery truck, an automobile, a train, a ferry, aircraft, cruise ship, tanker, or any other suitable vehicle or other mobile environment, including a towed conveyance, such as a trailer towed with a motorized vehicle. In some embodiments, the automated storage and retrieval system is configured to operate within a non-mobile environment, such as a warehouse, retail store, grocery store, or any other suitable location.

In some embodiments, the automated storage and retrieval system 100 comprises an area 102 configured or holding one or more parcels. In some embodiments, the area 102 can be a large open space with little to no organization mechanisms (i.e., shelves, drawers, etc.). In some embodiments, the area 102 can comprise one or more trays, drawers, shelves, or any other suitable organization mechanism. In the embodiment depicted in FIG. 1, the area 102 comprises one or more automatically operated drawers (i.e., they are automatically opened and closed). In some embodiments, the area 102 includes a dedicated compartment for extra-large parcels that cannot fit in the one or more storage trays or bins. In some embodiments, the storage trays, bins, drawers, etc., are configured such that they are secured and as stationary as possible even when the delivery truck has a severe pitch or tilt.

In some embodiments, the automated storage and retrieval system 100 comprises a parcel inductor 104 configured to induct one or more parcels into the area 102. In some embodiments, the parcel inductor 104 can be a simple door or flap that is opened and the parcel and is given to the parcel conveyor 106. The parcel inductor 104 can also be a be an electronically operated or mechanically operated crane or other suitable device. In some embodiments, the parcel inductor 104 can be configured to receive parcels from a human, a robot, or a drone. In any case, the parcel inductor 104 can be retrofitted to receive the parcels via any suitable means. For example and without limitation, if a parcel is received via drone, the parcel inductor can include a platform or other suitable device to help receive the drone. In some embodiments, the parcel inductor 104 is configured to retrieve packages from a standard distribution warehouse dock using manual pick and place methods or automated sortation conveying systems. In some embodiments, the automated storage and retrieval system 100 is configured to induct and retrieve packages from an aerial package transport device or other autonomous delivery transport systems.

In some embodiments, the parcel inductor 104 comprises, is connected to, or interfaces with the parcel conveyor 106. In some embodiments, the parcel conveyor 106 can comprise a conveyor belt, a crane, a robotic arm, a robotic claw, or other suitable device configured to convey the parcels inducted into the parcel inductor 104 into the area 102. Once the parcel has been conveyed to its destination within the area 102, a mechanism is configured to deliver the parcel to a shelf, drawer, tray, etc. from the parcel conveyor 106. In some embodiments, this mechanism could be a robotic arm, a lift, an elevator, mechanical claw, etc. In some other embodiments, the conveyor 106 comprises a robotic arm or crane which is configured to convey the parcels from the parcel inductor 104 to the appropriate tray, shelf, drawer, etc.

In some embodiments, the mechanism (not shown) configured to convey the parcel from the parcel conveyor 106 to the shelf, drawer, tray, etc. is also configured to take out a parcel from the tray, drawer, shelf, etc., convey it back to the parcel conveyor 106, which is then configured to convey the parcel to the parcel extraction station 108 configured such that a user of the automated storage and retrieval system 100 can obtain the parcel from the parcel extraction station 108. For example and without limitation, as shown in FIG. 1, the parcel extraction station 108 can be a slot, hole, and/or mechanism configured to allow the parcel to be conveyed out of the area 102. In some embodiments, for example and without limitation, the parcel extraction station 108 can be a slot or hole where the parcel conveyor 106 can convey the parcel sitting inside of one of the trays or drawers out of the area 102 for the user to extract. In some embodiments, the parcel extraction station 108 can be an opening in the area 102 where one or more parcels are conveyed for extraction.

Figure 2:
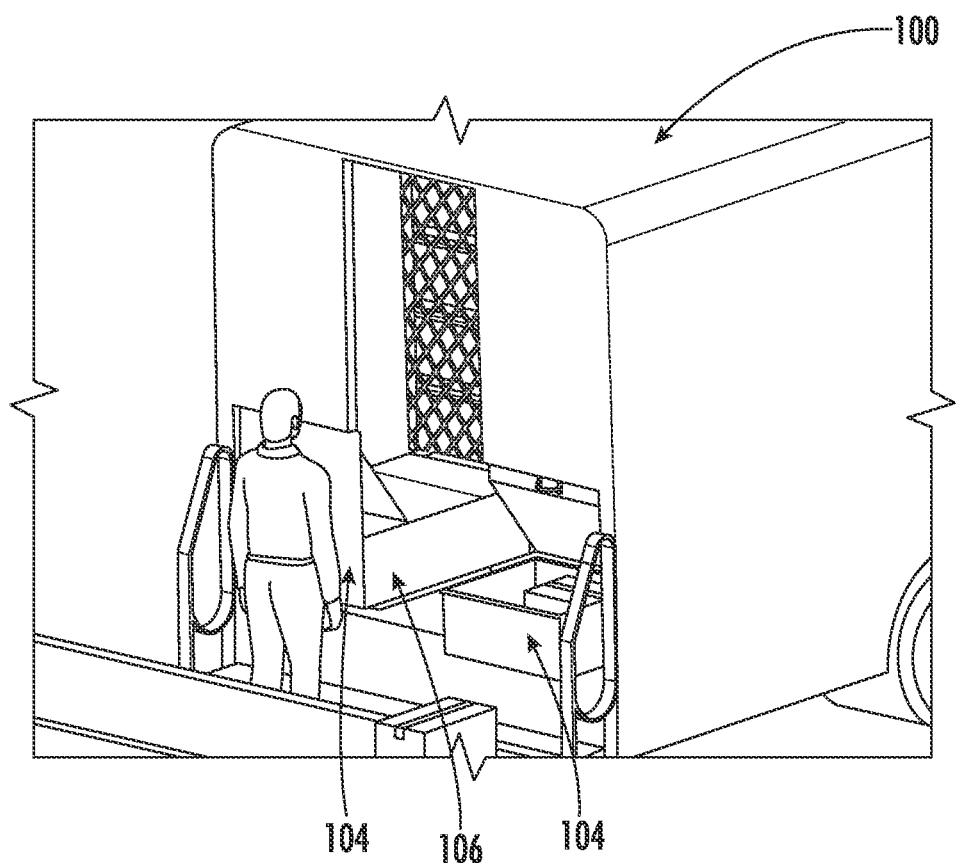
FIG. 2 is an isometric view of the vehicle of FIG. 1, showing an example embodiment of a parcel induction station of, or associated with, the ASRS.

Referring next to FIG. 2, which illustrates the parcel induction station 104. In some embodiments, the parcel induction station 104 can be located at the back of a delivery truck or any other suitable area 102 where the automated storage and retrieval system 100 is located. In some embodiments, a user, such as a person, drone, robot, or any other suitable user, can approach the parcel induction station 104 with a parcel and induct the parcel into the automated storage and retrieval system 100 via the parcel induction station 104. In some embodiments, the automated storage and retrieval system 100 can comprise one or more parcel induction stations 104. For example, as illustrated in FIG. 2, in some embodiments, the automated storage and retrieval system 100 can comprise two parcel induction stations 104.

Figure 3:
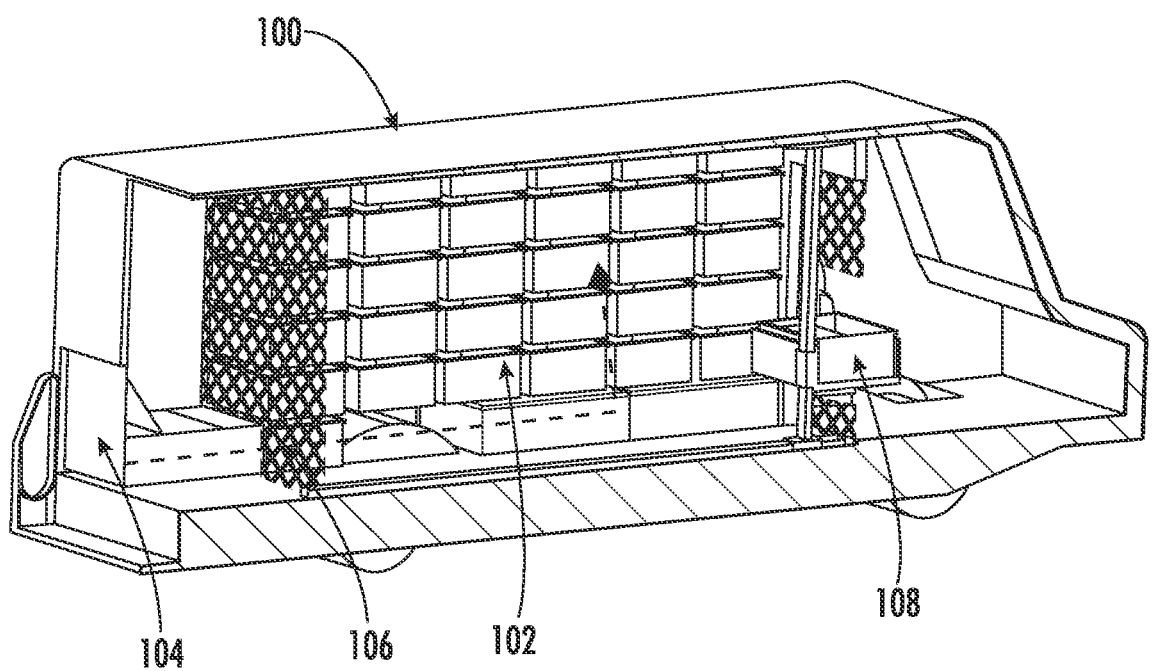
FIG. 3 is a cross-sectional view of the vehicle of FIG. 1, showing an example induction path for a parcel inducted into the ASRS at the parcel induction station.

Referring next to FIG. 3, which illustrates the path that a parcel follows (arrow) along the parcel conveyor 106. As described above, once the parcel is inducted and received by the parcel conveyor 106, the parcel is deposited, either by the parcel conveyor itself (if it is a robotic arm or crane or other device) or by a separate mechanism, such as a robotic arm, crane, or other device separate from the parcel conveyor, into one of the trays, shelves, bins, or drawers. Although this illustration only shows half of the inside of an example delivery truck, as described above, the delivery truck can have shelves of bins, trays, and drawers on both sides of the truck inside the area 102. In some embodiments, the trays, bins, drawers, or other storage areas can be self-locking trays. In some embodiments, the area 102 comprises one or more storage trays, bins, or drawers/ storage areas configured to store parcels ranging in size from letters and postcards to parcels as large as the one or more storage trays, bins, or storage areas.

In some embodiments, the parcel conveyor 106 comprises a crane configured to move dynamically based on the delivery truck's movement, speed, acceleration, braking, tilt, and other similar environmental forces. In some embodiments, the area 102 includes a dedicated compartment for extra-large parcels that cannot fit in the one or more storage trays or bins.

Figure 4A:
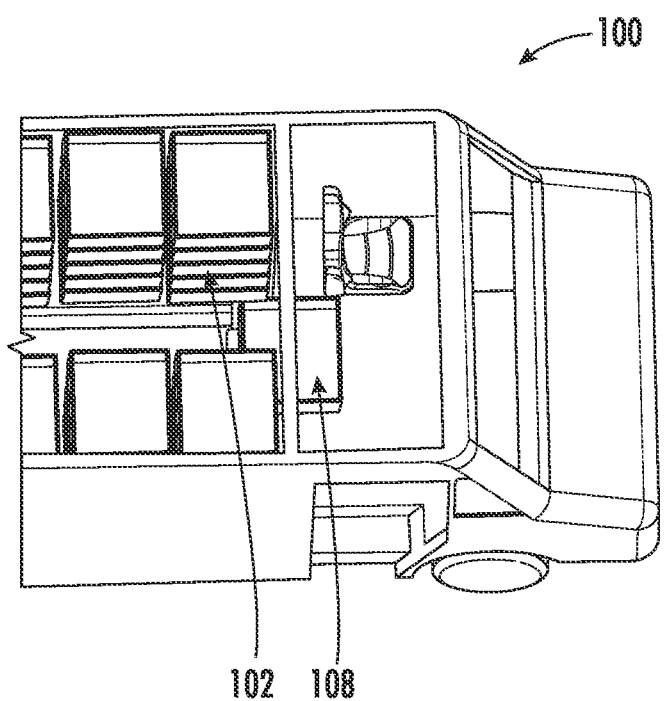
FIG. 4A is a top internal view of a portion of the vehicle of FIG. 1.

Referring to FIG. 4A, which illustrates a top inside view of an example delivery truck comprising an automated storage and retrieval system 100 according to some embodiments of the present disclosure. As illustrated in FIG. 4A, the parcel extraction station 108 is located near the seat of the driver of the delivery truck. In some embodiments, automated storage and retrieval system 100 can remove the tray, drawer, or other storage area where the parcel being extracted is located and move it out of the area 102 via the extraction station 108. As illustrated in FIG. 4A, the drawer, tray, etc. itself can be, at least partially, pushed via the automated storage and retrieval system 100 out of the area 102 through the extraction station 108, where the parcel is presented to the user (i.e., driver in this embodiment) for extraction and delivery. In some embodiments, including, for example, embodiments in which the vehicle is an autonomous vehicle, the user referenced herein can be a customer to whom the parcel is intended to be delivered.

Figure 4B:
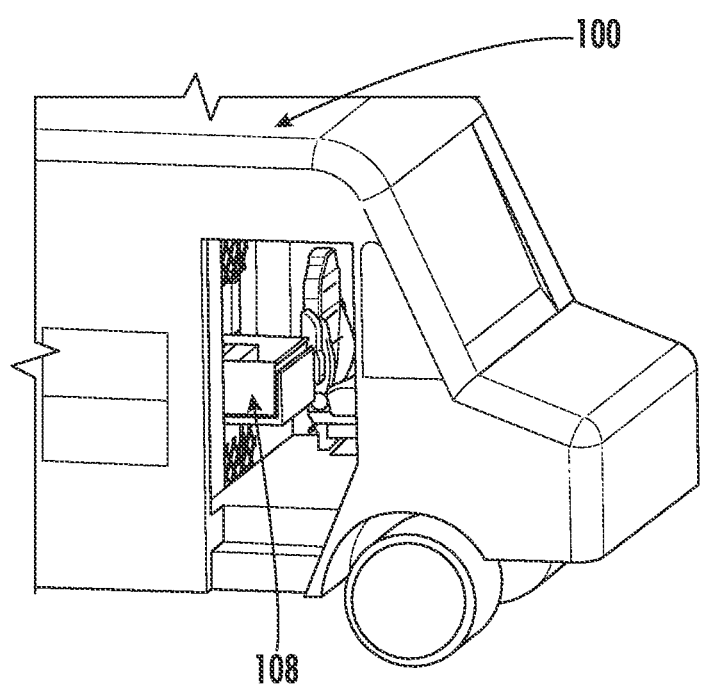
FIG. 4B is an isometric view of a portion of the vehicle of FIG. 1.

Referring to FIG. 4B, which illustrates an exterior view of the inside front portion of the example delivery truck which gives a better view of the extraction station 108. In some embodiments, the extraction station 108 can comprise a drawer, slot, or other suitable mechanism that interfaces the area 102 with the front of the delivery truck. As illustrated in FIG. 4B, once the tray, drawer, bin, etc. containing the parcel to be extracted is placed in or through the extraction station 108, the delivery truck driver, or user, can extract the parcel and deliver it.

In an embodiment, the extraction station 108 comprises an automatic or non-automatic drawer that is configured to open towards the front of the delivery truck with the parcel inside. The drawer can either be manually opened by the user (i.e., the driver) or it can be automatically opened by an electronic motor or actuator or other suitable device. Once the drawer is opened, the user can extract the parcel and deliver it.

In some embodiments, the automated storage and retrieval system 100 is encompassed in an autonomous delivery truck, wherein the delivery truck is configured to navigate and drive itself using autonomous driving software and other suitable equipment needed to navigate and operate the delivery truck. In some embodiments, the autonomous delivery truck is configured to drive itself to predetermined locations for consumer or customer pick-up. In such an embodiment, the autonomous delivery truck is configured with autonomous cranes, robotic arms, conveyor belts, and other mechanisms to automate the entire process of inducting a parcel, conveying the parcel into the area 102 and extracting the parcel and deliver it automatically, using the autonomous cranes, robotic arms, etc.

In some embodiments, the automated storage and retrieval system 100, including those on the delivery trucks, is configured to operate untethered from standard AC line power. In some other embodiments, the automated storage and retrieval system 100 is configured to operate when the delivery truck engine or drive motor is off.

Figure 5:
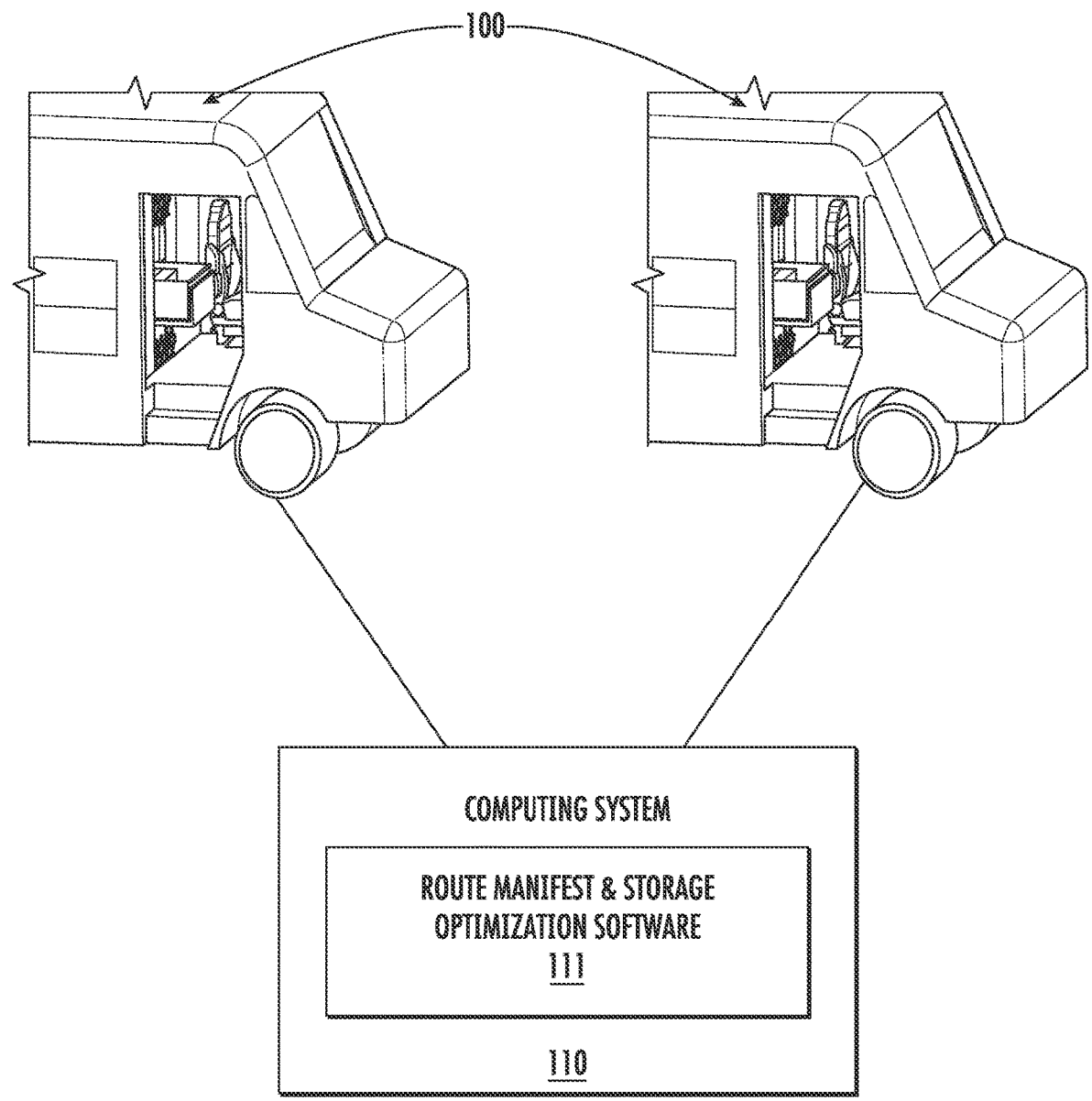
FIG. 5 is a schematic illustration for an example embodiment of a parcel delivery system, having a plurality of ASRS's, which are installed within a respective one of a plurality of vehicles, and a computing system in communication with the each ASRS.

Regardless of whether the delivery truck is automated or driven by a human, the way that the parcels are inducted and organized in the area 102 of the automated storage and retrieval system 100 is based on a parcel delivery route manifest of the delivery truck. Referring to FIG. 5, which illustrates a parcel delivery system comprising one or more automated storage and retrieval systems 100 encompassed within one or more delivery trucks and a computing system 110 in communication with the one or more automated storage and retrieval systems 100.

In some embodiments, the computing system 110 is configured to generate the parcel delivery route manifest of the one or more delivery trucks. The computing system 110 is configured to calculate this by determining where all the pending parcels are to be delivered, efficiently organizing them for each specific delivery truck, and then pre-sorting the parcels so that they can be inducted into the automated storage and retrieval system 100 in the most efficient way possible for delivery. Once the parcel delivery route manifest is generated by the computing system 110, the computing system 110 is configured to transmit a relevant portion of the route manifest to each corresponding delivery truck. For example, each delivery truck will have a route that corresponds to a portion of the parcel delivery route manifest. The induction process includes presorting the parcels as they are being stored in the area 102. The presorting process is performed based on the route manifest (i.e., sorting in the area 102 based on the delivery address of the parcels) and then the parcels are stored in the area using a storage optimization software that calculates how best to optimize and store the parcels. In some embodiments, the route manifest and storage optimization software 111 is configured to generate an optimized storage logic for storing parcels in the one or more storage trays, bins, or storage areas before the parcels are inducted into the area. In some embodiments, the route manifest and storage optimization software 111 is further configured such that as the parcels are delivered the relevant portion of the route manifest is updated and optimized. Additionally, in some embodiments, the parcel delivery system is configured to notify a driver of the delivery truck that one or more secondary parcels go to the same destination address.

Figure 6:
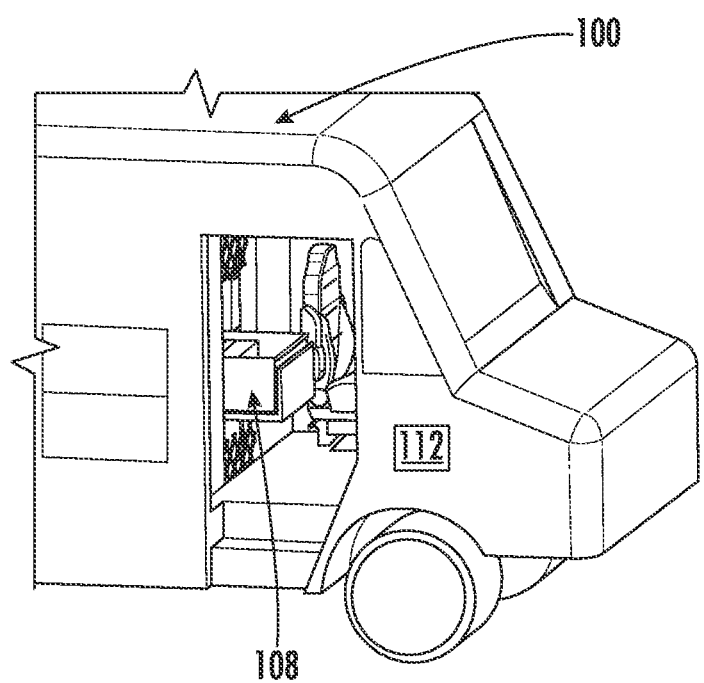
FIG. 6 is a schematic illustration of an example embodiment of the vehicle of FIG. 1, in and/or on which an example embodiment of a geo-guidance system is provided.

Referring to FIG. 6, in some embodiments, the automated storage and retrieval system 100 can comprise a geo-guidance system 112 configured to help navigate corresponding delivery truck that the geo-guidance system 112 is attached to based on the parcel route manifest. In some embodiments, the geo-guidance system is configured to provide delivery information to the driver of the delivery truck based on the parcel being delivered, this includes delivery information to an automated driver of the delivery truck.

In some embodiments, the geo-guidance system 112, and the parcel conveyor are configured to communicate with each other in order to extract the parcel that currently needs to be delivered or the one that needs to be delivered next. In some embodiments, as the current parcel is being delivered, the geo-guidance and parcel conveyor are configured to communicate with each other in order to start the extraction process of the parcel that is next up for delivery. In other words, which the delivery driver is dropping off the next package, the automated storage and retrieval system 100 is configured to determine the next stop for parcel delivery based on the route manifest and the geo-guidance system and then automatically take down the next parcel (or bin that the next parcel is located) and convey it to the parcel extraction station.

In some embodiments, if more than one parcel is to be delivered at the current delivery location of the delivery truck, the automated storage and retrieval system 100 is configured to inform the user or delivery truck driver that the multiple parcels are to be delivered. In some embodiments, the parcel conveyor is configured to automatically convey an appropriate parcel to the parcel extraction station at or before a time a driver of the delivery truck arrives at the delivery address of the appropriate parcel.

Figure 7:
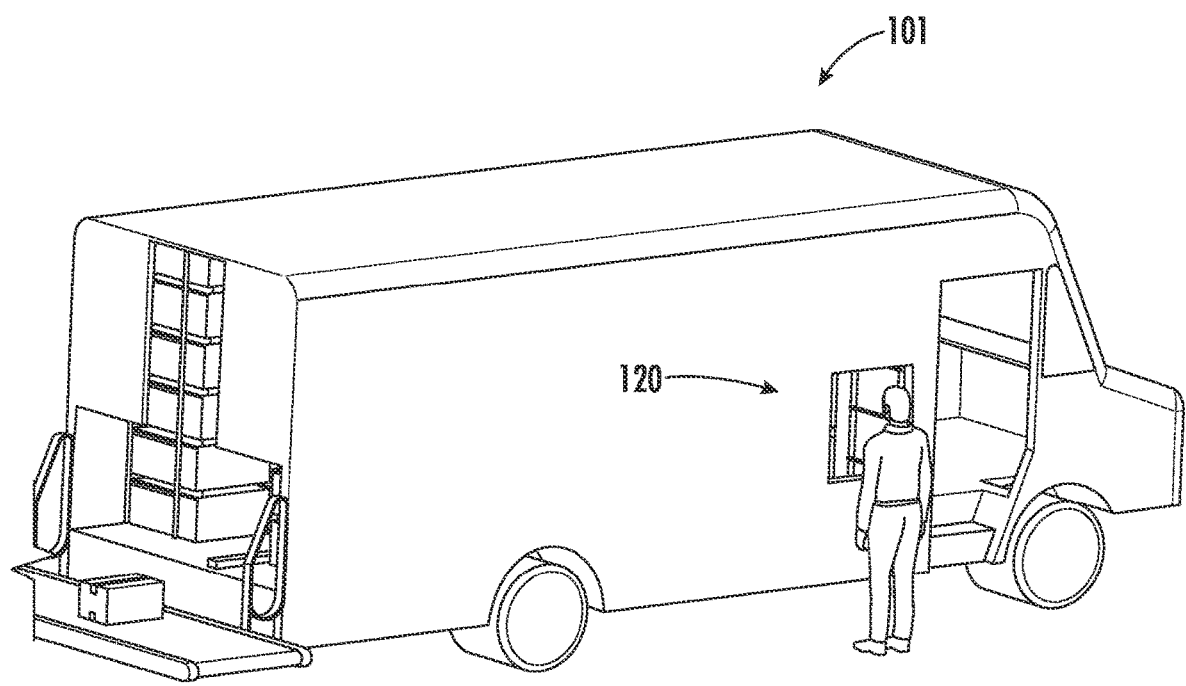
FIG. 7 is an isometric view of another example embodiment of a vehicle, in which is arranged an example embodiment of an ASRS and which has a retrieval portal positioned on a lateral side of the ASRS.
Figure 8:
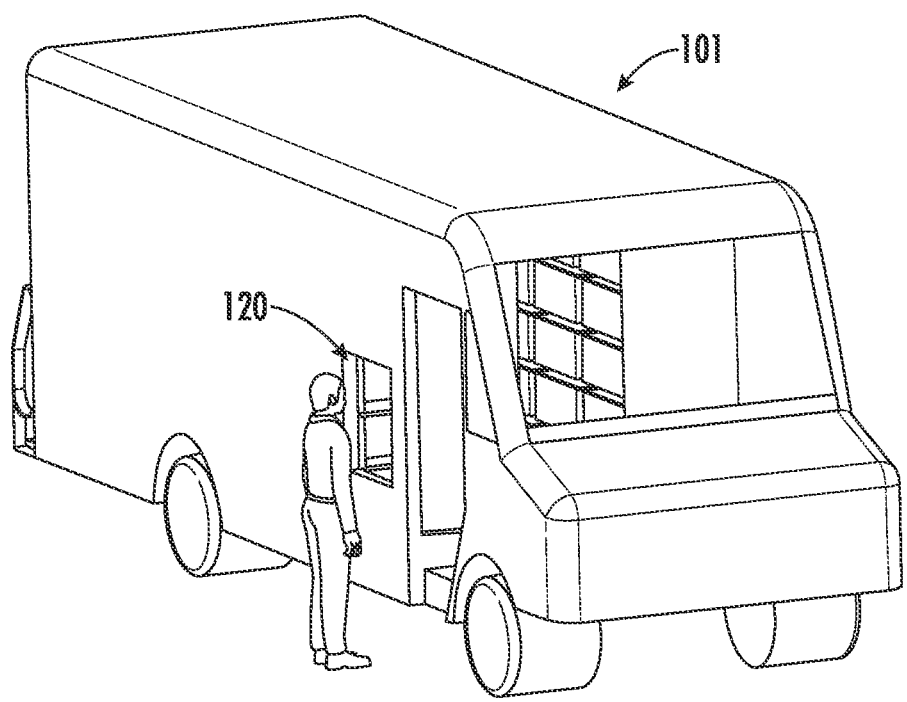
FIG. 8 is another isometric view of the example embodiment of the vehicle of FIG. 7.

FIGS. 7 and 8 show various aspects of another example embodiment of a vehicle with an automated storage and retrieval system 101 provided therein. Automated storage and retrieval system 101 is generally similar to automated storage and retrieval system 100 and like structures and features will not be described again herein. The automated storage and retrieval system 101 includes an external parcel retrieval station, generally designated 120, through which parcels stored and transported within the automated storage and retrieval system 101 are movable through an opening formed in and through an external surface of the vehicle, such as the lateral side of the vehicle. The automated storage and retrieval system 101 is advantageously equipped with a user-authentication system, which can be positioned at the external parcel retrieval station 120, so that the identity of the person at the external parcel retrieval station 120 can be authenticated to prevent delivery of parcels to unauthorized persons. The vehicle shown in FIG. 8 can be, for example, an autonomous vehicle (e.g., a vehicle that is operated without a human operator, or driver) that is configured to detect the presence of a person, stop, and allow the person access to the external parcel retrieval station 120. Once the parcel is retrieved by the user, the autonomous vehicle can detect that the user is a sufficiently safe distance away and then proceed to the next place where a parcel is to be delivered.

In some embodiments, the vehicle, whether autonomous or operated by a human, can be summoned by a user (e.g., by sending a command through software, such as a mobile application), such that the route of the vehicle can be updated in real-time based on user input and/or availability. For example, an optimized route may be planned for delivery of all of the parcels within a specific geographic location or boundary and recipients may be notified of an estimated time of arrival of the vehicle. If a recipient is expected to be unavailable around the estimated time of arrival, the recipient may send a command (e.g., press a virtual button on a software interface, such as a mobile application) containing the customer's unavailability and, optionally, a period of time during which the customer would be available. In response, the vehicle, or a centralized controller for one or more vehicles, would receive this input and calculate a new optimized route, if necessary, to provide delivery to the recipient either during the period of time indicated by the recipient or to reschedule for another day. This is particularly advantageous when an autonomous vehicle is used or when, for example, the parcel must be delivered directly to the recipient, such as in instances where signature is required for proof of delivery.

In some embodiments, the automated storage and retrieval systems 100, 101 disclosed herein can include a portion, or all, of the area 102 that is chilled or refrigerated to a prescribed temperature to allow for the transport and delivery of temperature-sensitive items, such as perishable foods, medications that must be stored within prescribed temperature limits, and other similar temperature-sensitive items. In some embodiments, the area 102 could be heated above an ambient temperature to maintain a temperature of items contained within, such as prepared meals.

As used herein, the terms user, recipient, and person can be used interchangeably to refer to the driver or operator of the vehicle or to the person designated for receipt of a parcel.

Figure 9:
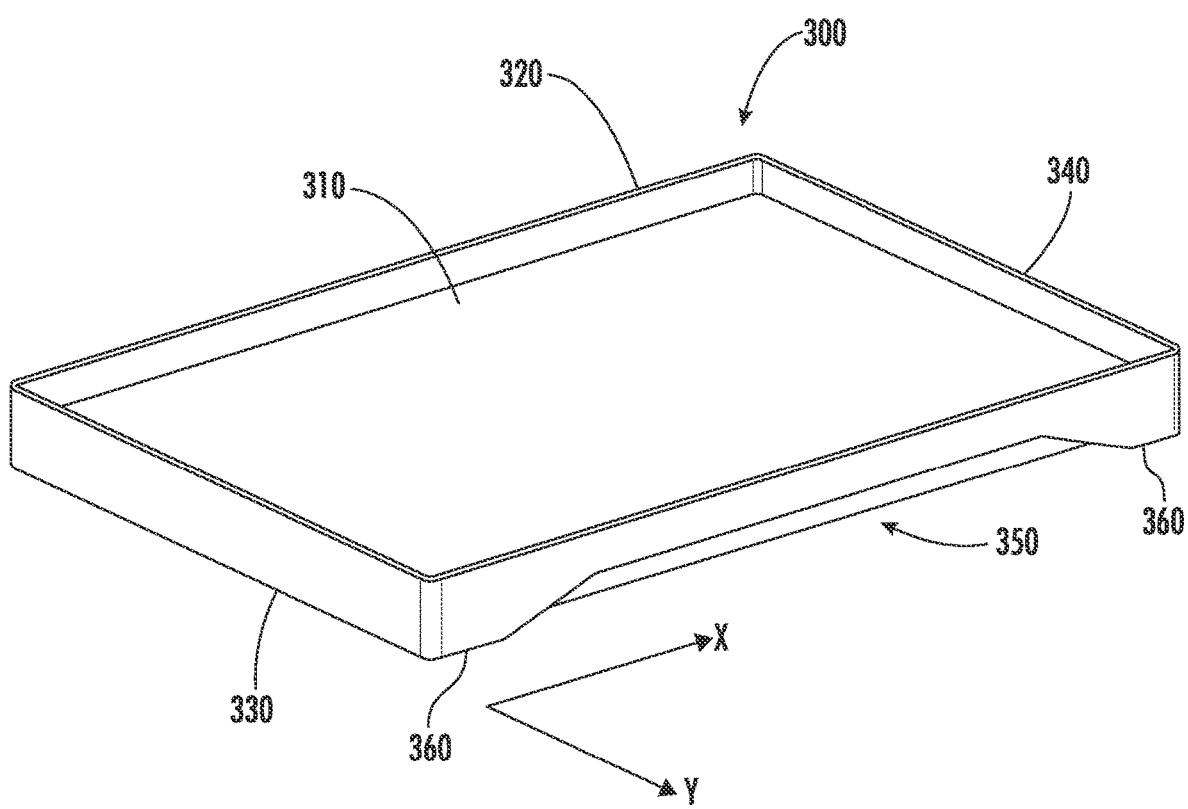
FIG. 9 is an isometric view of an example embodiment of a storage tray for use in an ASRS according to any of the embodiments disclosed herein.
Figure 10:
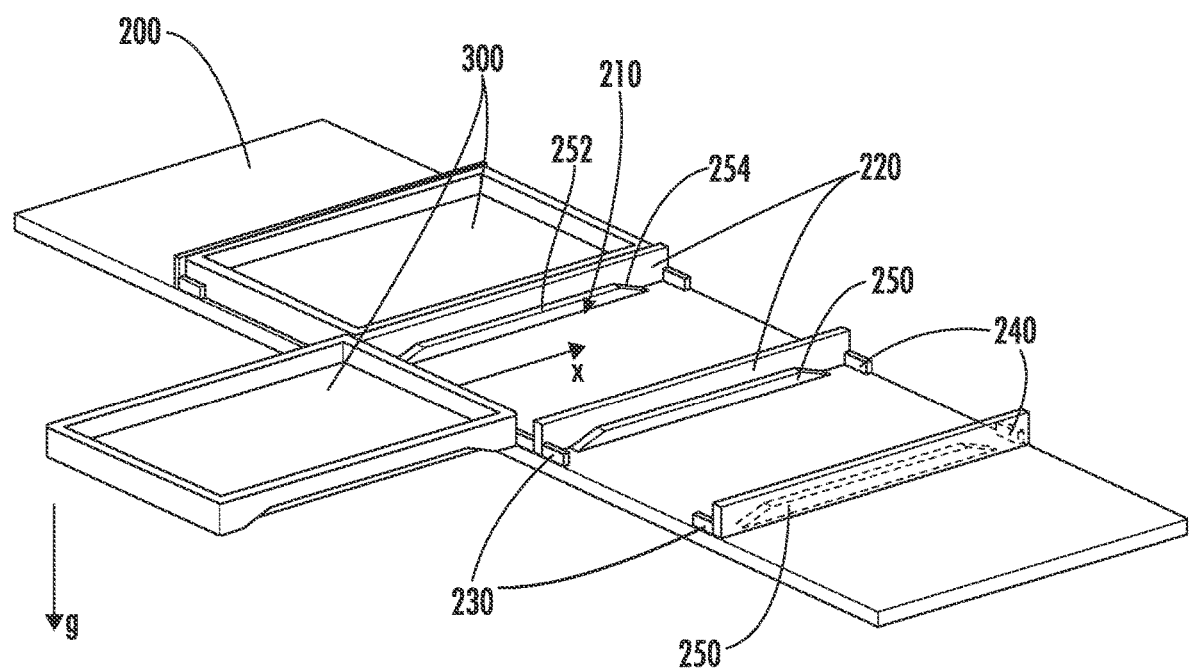
FIG. 10 is an isolated view of the storage tray of FIG. 7 being deposited onto a shelf having a plurality of storage bays positioned thereon to allow for a plurality of storage trays to be deposited onto the shelf.

FIG. 9 shows various aspects of an example embodiment of a storage tray, generally designated 300, which is suitable for use in the automated storage and retrieval systems 100 disclosed herein. In conjunction with the features of the example embodiment of the shelf 200 shown in FIGS. 10-17, the storage tray 300 and the features of the shelf 200 form a self-locking assembly suitable for securing items therein even during transport (e.g., while being driven in a conveyance, such as a motor vehicle, and, particularly, in a parcel delivery truck).

Each storage tray 300 has an upper surface 310, which is in contact with (e.g., direct contact) one or more items positioned thereon (e.g., in direct contact with). The upper surface 310 has, around a perimeter of the upper surface 310, a vertical wall 320 that extends vertically upwardly and away from the upper surface 310, the vertical wall 320 being designed, provided, and/or configured to prevent items positioned on the upper surface 310, within the area defined by the vertical wall 320, from being dislodged from (e.g., from falling off of) the storage tray 300 during normal operation. The size of the upper surface 310 is advantageously larger than, or substantially similar to, the items designated for being positioned on the storage tray 300. The storage tray 300 has a recess, generally designated 350, formed on each lateral side thereof, the lateral sides extending (e.g., entirely) between the front surface 330 and the rear surface 340.

Each shelf 200 has a plurality of dividers 220 spaced out along the width thereof (e.g., in the Y-direction) to form a plurality of storage bays, generally designated 210, along the length of each shelf 200. In some embodiments, a plurality of shelves 200 are arranged to form a two-dimensional array of storage bays 210 (e.g., within one or more regions of an automated storage and retrieval system 100). The dividers 220 are, in some embodiments, integrally formed (e.g., in a monolithic fashion) with each shelf 200; in some other embodiments, the dividers 220 are movably (e.g., in the Y-direction) attached to a shelf 200, thereby allowing for the dimensions of each storage bay 210 on a shelf 200 to be configurable and/or adjustable, such as may be based on the shape of the storage tray 300 designated to be placed and/or held in such storage bay 210. In an example embodiment of such a shelf 200 having movable dividers 220, the shelf 200 may have a plurality of attachment features arranged along the width thereof, in the Y-direction. The arrangement of the attachment features along the shelf 200 can be according to any suitable layout and can include, for example, a pattern. In some embodiments, each attachment feature of the shelf can be a hole, a clip, a portion of a clip, a connector, a portion of a connector, and/or any suitable type of attachment. The dividers 220 then are provided with one or compatible, or mating, attachment features that are configured for engagement with the attachment features (e.g., protrusions, a clip, a portion of a clip, a connector, a portion of a connector, and/or any suitable type of fastener) on the shelf 200, such that, by engagement of the attachment features of the dividers 220 with the attachment features of the shelf 200, a rigid attachment of the dividers 220 to the shelf 200 is provided.

For example, in embodiments in which the attachment features of the shelf 200 are holes formed partially or entirely through the thickness of the shelf 200, each divider 220 may have one or more pins or other suitable longitudinally extending member for locking insertion within one of such holes formed in the shelf 200. In some embodiments, the attachment feature(s) of the dividers 220 may be keyed to prevent rotation of the dividers 220 relative to the shelf 200. In another example embodiment, both the shelf 200 and the dividers 220 can have compatible mating clips that connect rigidly together, either in a permanent or removable manner. In some embodiments, the dividers 220 may be riveted to the shelf 200 to form a plurality of storage bays, generally designated 210, along the shelf 200. In any of the embodiments disclosed herein, each of the storage bays 210 may have a width that is substantially identical to (e.g., allowing for assembly tolerances) each other, or one or more of the storage bays 210 may have a width that is different from a width of other storage bays 210. The storage bays 210 can be provided in any suitable dimension and arrangement, such as may be advantageous for accommodating a storage tray 300 having particular dimensions therein.

A protrusion 250 is provided along the lateral edges (e.g., in the Y-direction) of each storage bay 210, extending along the length (e.g., in the X-direction) of the divider 220 and also in the Y-direction. The protrusions 250 can be referred to as a "lock" elsewhere herein. Each storage bay 210 may have any suitable number of protrusions 250, however, in the example embodiment shown, each storage bay 210 has two protrusions 250, each protrusion 250 being arranged on opposite sides of the storage bay 210 in the Y-direction from the other protrusion 250 in the same storage bay 210. The protrusions 250 can be integrally formed with (e.g., in a monolithic, unitary, indivisible fashion) an adjacent divider 220 or can be rigidly attached an adjacent divider 220. In some embodiments, the protrusions 250 are physically separate from (e.g., are not adjoined to) the dividers 220. In some embodiments, the protrusions 250 can be spaced apart from (e.g., not in direct contact with, having an air gap between) the adjacent divider 220; in such embodiments, the protrusion 250 can be directly affixed to the surface of the shelf 200.

As noted elsewhere herein, each storage tray 300 has a recess 350 formed on each lateral side of the storage tray 300. The recess 350 is substantially the same size as the protrusion 250, so that the protrusion 250 can be positioned within, partially and/or entirely, the recess 350. The protrusion 250 and the recess 350 advantageously extend less than a full length of the divider 220 with which such protrusion 250 and recess 350 are associated. The protrusion 250 has a flat top surface 252 and a sloped surface 254 at each end of the top surface 252 in the Y-direction. The recess 350 has surfaces that correspond to (e.g., are substantially identical to) the top surface 252 and the sloped surfaces 254, such that the recess is shaped to have a profile, when viewed in the X-direction, that is substantially identical to the profile of the protrusion 250, when viewed in the X-direction. Thus, the recess 350 is essentially formed as a negative space of the protrusion 250. As shown, the protrusion 250 and the recess 350 have general shape of a trapezoidal prism. The recess 350 is formed such that the sloping portions thereof have an angle that is substantially identical to the angle of the sloped surface 254 of the protrusion 254 at the same end thereof in the Y-direction.

The slope of the respective surfaces of the protrusion 250 and the recess 350 at a first end of the shelf 200 and the storage tray 300, respectively, can be the same as or different from the slope at of the protrusion 250 and the recess 350 a second end of the shelf 200 and the storage tray 300, respectively, the second end being an opposite end from the first end in the Y-direction. As such, the storage tray 300 has, adjacent to the respective first and second ends of the recess 350, a flat portion 360 on the lateral sides (e.g., in the Y-direction) of the storage tray 300, the flat portion 360 being adjacent to the front surface 330 and the rear surface 340. The flat portions 360 are surfaces of the storage tray 300 on which the storage tray 300 can slide along the sloped and flat surfaces 252, 254 of the protrusion 250, such sliding of the flat portion 360 along one of the sloped surfaces 254 causing a vertical and lateral movement that changes a vertical positions of the storage tray 300, such that the bottom surface (e.g., the flat portions 360) of the storage tray 300 is at a same vertical position as the flat top surface 252 of the protrusion 250. The protrusions 250 in a same storage bay 210 advantageously have a same height so that the storage tray 300 is substantially flat while the flat portion(s) 360 slide over and/or along the length of the flat top surface 252 of the protrusions 250.

At least one (e.g., one or a plurality of) front wall 230 is arranged at the front edge of the storage bay 210 and at least one (e.g., one or a plurality of) rear wall 240 is arranged at the rear edge of the storage bay 210. The front and rear walls 230, 240 advantageously have a same height as the protrusions 250 in the same storage bay 210, so that the top surface of the front and rear walls 230, 240 is substantially coplanar with the flat top surface 252 of the protrusions 250 in the same storage bay 210. The attachment of the front and rear walls 230, 240 can be the same as or different from the attachment type by which the dividers 220 are secured to the shelf 200. In some embodiments, the shelf 200 may have a plurality of attachment features arranged along the width thereof, in the Y-direction, the attachment features corresponding to positions where a front wall 230 or a rear wall 240 can be secured to the shelf 200. The arrangement of the attachment features along the shelf 200 can be according to any suitable layout and can include, for example, a pattern. In some embodiments, each attachment feature of the shelf can be a hole, a clip, a portion of a clip, a connector, a portion of a connector, and/or any suitable type of attachment. The front and rear walls 230, 240 then are provided with one or compatible, or mating, attachment features that are configured for engagement with the attachment features (e.g., protrusions, a clip, a portion of a clip, a connector, a portion of a connector, and/or any suitable type of fastener) on the shelf 200, such that, by engagement of the attachment features of the front wall 230 or rear wall 240 with the attachment features of the shelf 200, a rigid attachment of the front and rear walls 230, 240 to the shelf 200 is provided.

By way of example, in embodiments in which the attachment features of the shelf 200 are holes formed partially or entirely through the thickness of the shelf 200, each front wall 230 or rear wall 240 may have one or more pins or other suitable longitudinally extending member for locking insertion within one of such holes formed in the shelf 200. In some embodiments, the attachment feature(s) of the front and/or rear walls 230, 240 may be keyed to prevent rotation of the front wall 230 or rear wall 240 relative to the shelf 200. In another example embodiment, both the shelf 200 and the front and/or rear walls 230, 240 can have compatible mating clips that connect rigidly together, either in a permanent or removable manner. In some embodiments, the front and/or rear walls 230, 240 may be riveted to the shelf 200 to form the front and rear boundary edges, respectively, of the storage bay 210 in which such front and/or rear walls 230, 240 are provided.

The front and rear walls 230, 240 at the front and rear edges of the storage bays 210, as well as the positioning of the protrusions 250 within a corresponding one of the recesses 350 formed in the storage tray 300 act in concert to prevent, resist, and/or restrict movement of the storage tray 300 positioned within the storage bay 210 relative to the shelf 200 in the X-direction without the bottom surface of the storage tray 300 at the front surface 330 and/or the rear surface 340 being vertically displaced (e.g., lifted) within the storage bay 210. The front and rear walls 230, 240 are advantageously arranged at the lateral edges (e.g., spaced apart in the Y-direction) of the storage bay 210 and extend into the storage bay 210 in the Y-direction by a distance greater than a thickness of the recesses 350 of the storage tray 300 in the Y-direction, such that the edges of the storage tray 300 that form an inner surface of the recess 350 are positioned to contact and slide over the top surface of the front wall(s) 230 as the storage tray 300 is deposited into the storage bay 210 or removed from the storage bay 210.

Each protrusion 250 extends generally longitudinally in the X-direction on an opposite sides of the storage bay 210 from another protrusion 250. Advantageously, the protrusions 250 in the same storage bay 210 have the same shape as each other. In the embodiment shown, the protrusions 250 have a length (in the X-direction) that is less than the length of the divider 220 to which the protrusion 250 is adjacent, but the protrusions 250 in a storage bay 210 may be the same length as or, in some embodiments even, longer than the dividers 220 that define the lateral boundary edges of the storage bay 210 in which such protrusions 250 are provided. As such, in the example embodiment shown in FIG. 14, the storage tray 300 has a bottom surface, generally designated 370, with a profile (e.g., outline) that is generally in the shape of the letter "I", in which the vertical portion of the "I" has a width that is only slightly smaller than (e.g., having a width that is at least 75%, 80%, 85%, 90%, or 95% of) the total width of the "I", which is defined by the horizontally-extending portions. "Vertical" and "horizontal" are, as used immediately hereinabove, used to refer to literally the shape of the letter "I" and are not made in reference to any specific accompanying drawing.

Figure 14:
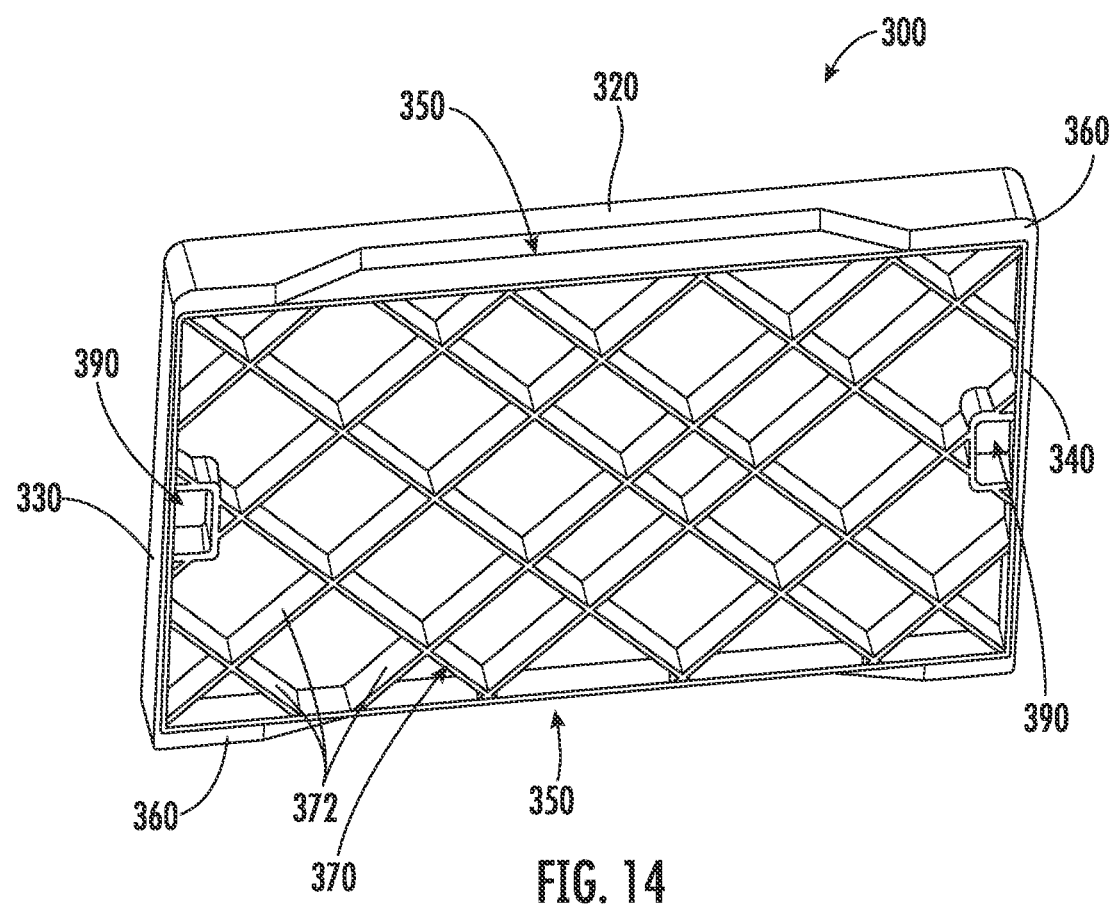
FIG. 14 is a bottom view of the storage tray of FIG. 7.

Stated somewhat differently, but still referring to the example embodiment shown in FIG. 14, the bottom surface 370 of the storage tray 300 has a profile that is generally in the shape of a large rectangle, with "tabs" in the form of smaller rectangles (e.g., defined by the bottom surface of the flat portions 360) attached to the corners of the large rectangle on the lateral edges of the large rectangle (e.g., in the Y-direction). The dimensions of the smaller rectangles are determined by the difference between the length of the storage tray 300 and the recesses 350 (e.g., both as measured in the X-direction) and also by the depth of the adjacent recess 350 (e.g., as measured in the Y-direction). Non-rectilinear shapes can be used for any of the large rectangle and the smaller rectangles in lieu of the generally rectangularly-shaped structures shown in the example embodiment shown in FIG. 14. As such, when the storage tray 300 is being deposited into, or removed from, one of the storage bay 210 defined on the shelf 200, the flat portions 360 formed on the bottom surface 370 at the longitudinal ends of the recesses 350 are in contact with (e.g., direct contact) and slide along the flat top surface 252 and the sloped surface 254 of one of the protrusions 250 in the storage bay 210 into which, or from which, the storage tray 300 is being moved. The protrusions 250 have a thickness, as measured in the Y-direction, such that a distance, as measured in the Y-direction, between protrusions 250 in the same storage bay 210 is smaller than the width of the storage tray 300.

The shelf 200 has an upper surface against which the dividers 220, protrusions 250, and/or front and/or rear walls 230, 240 are attached (e.g., directly). Advantageously, the recesses 350 have a height (e.g., as measured in the direction of gravity, g) that is the same as, or less than, a height of the protrusion 250 with which such recess 350 will be aligned (e.g., to be substantially coaxial with in the X-direction), such that the bottom surface 370 of the storage tray 300 can rest against (e.g., be in direct or indirect contact with) the upper surface of the shelf 200.

Figure 11:
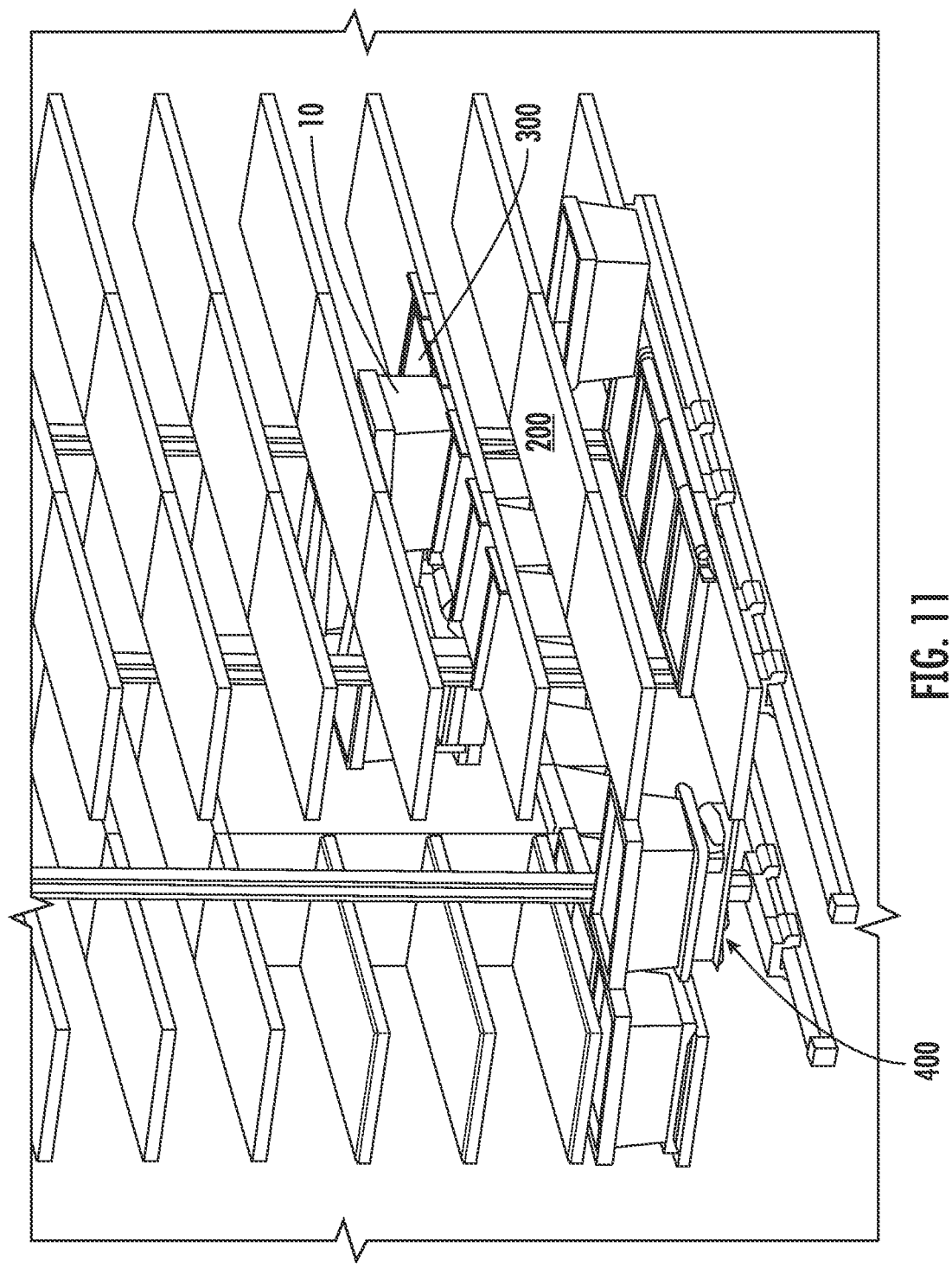
FIG. 11 is an isometric view of an example embodiment of an ASRS, such as the ASRS installed within the vehicle as shown in FIG. 1.
Figure 12:
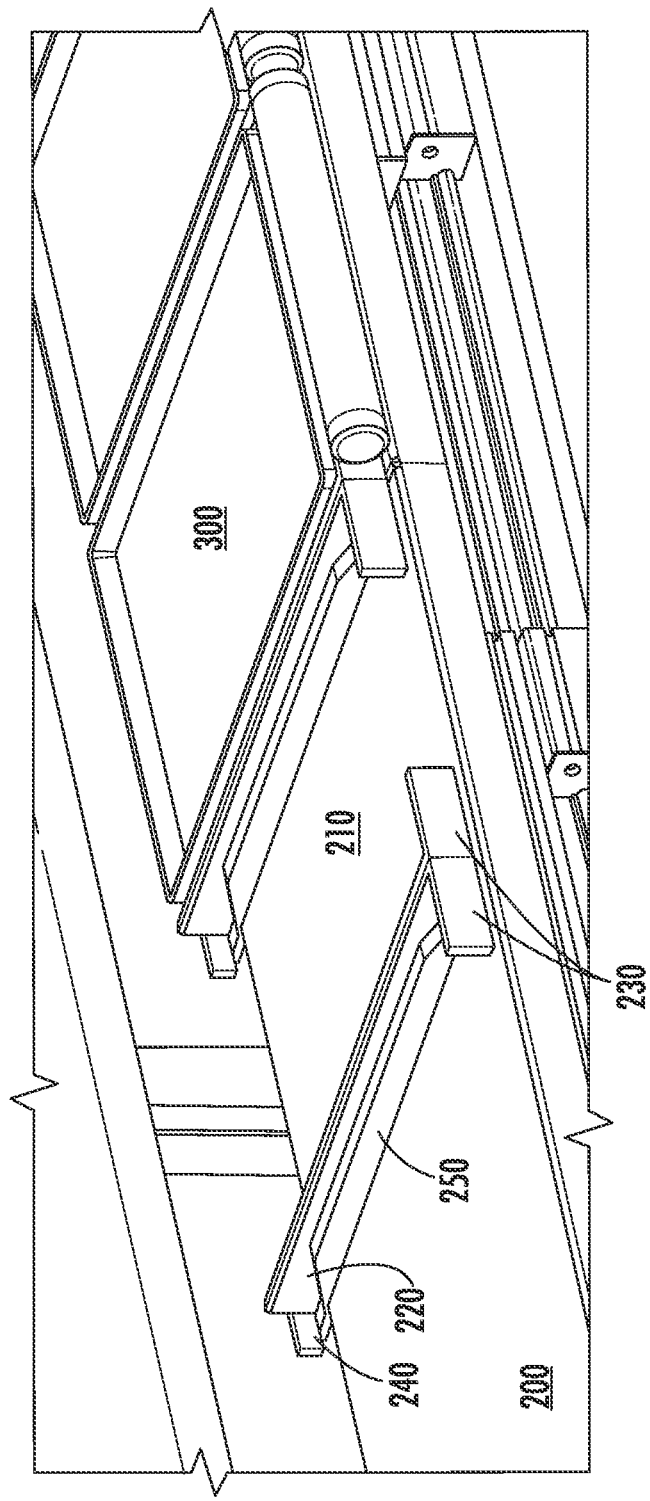
FIG. 12 is a detailed isometric view of a portion of the ASRS of FIG. 9.
Figure 13:
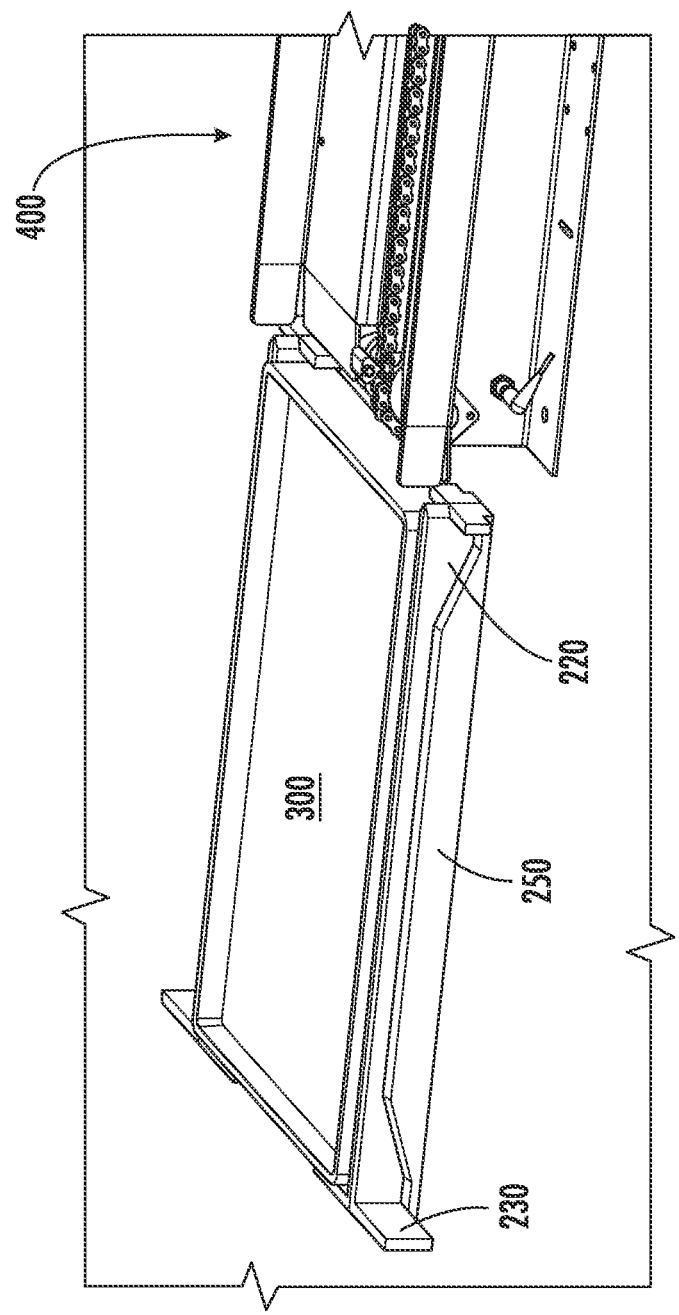
FIG. 13 is an isolated view of a storage tray positioned within a storage bay of an example embodiment of an ASRS, with a transport unit being arranged adjacent to the storage bay for depositing a storage tray within the storage bay and/or removing a storage tray from the storage bay.

As shown in FIG. 12, the divider 220, the protrusion 250, the front wall 230, and the rear wall 240 can be formed in a unitary, undivided, and/or monolithic structure (e.g., in a single piece requiring no assembly). In FIG. 14, the storage tray 300 is shown as having, between the surface on which the items are supported and the bottom surface 370, a honeycomb, or latticed, structure formed from a plurality of ribs 372 to advantageously provide a weight reduction for the storage tray 300. FIGS. 11 and 13 show various aspects of a transport system, generally designated 400, configured to transport storage trays 300 within an automated storage and retrieval system, an example of which is disclosed elsewhere herein, as well as to deposit and retrieve storage trays 300 into and/or from, respectively, one of the storage bays (e.g., 210) on the shelf 200. As shown in FIG. 14, a movement feature, generally designated 390, is formed in the bottom surface 370 of the storage tray 300, the movement feature 390 extending in the vertical direction (e.g., perpendicular to the plane formed by the X- and Y-directions) and having a cross-sectional shape that allows the transport system 400 to engage within the movement feature 390 (e.g., in the manner of a finger engaging within a cavity) to lift, move, deposit, and/or retrieve a storage tray 300 within the automated storage and retrieval system.

During deposit of the storage tray 300 into a designated storage bay 210, the transport system 400 is configured to engage with the movement feature 390 and drive the storage tray 300 within the designated storage bay 210 in the X-direction, sliding the storage tray 300 over the top surface of the front wall(s) 230 at the front edge of the storage bay 210 and the flat top surface 252 of the protrusions 250, as far as the rearmost (i.e., in the Y-direction) sloped surface 254 thereof, at which point the storage tray 300 slides along the sloped surface 254 until the rear surface 340 of the storage tray 300 contacts the rear wall(s) 240 at the rear edge of the storage bay 210 and/or until the bottom surface 370 of the storage tray 300 contacts the top surface of the shelf 200 within the storage bay 210, at which time the transport system 400 is configured to lower the front surface 330 of the storage tray 300 until the bottom surface 370 of the storage tray 300 is in contact with (e.g., coplanar with, including in direct contact with) the upper surface of the shelf 200 within the designated storage bay 210. As such, the front wall(s) 230 at least at the front edge of the storage bay 210 are spaced laterally apart (e.g., in the Y-direction) from the position of the movement feature 390 so as to not block access of the transport system 400 to the movement feature 390.

During removal of the storage tray 300 from a storage bay 210, the transport system 400 is configured to engage with the movement feature 390 and lift the front surface 330 of the storage tray 300 within the storage bay 210 to a height that is the same as, or higher than, a height of the top surface of the front wall(s) 230 at the front edge of the storage bay 210. The transport system 400 is then configured to pull, via engagement with the movement feature 390, the storage tray 300 out of the storage bay 210 in the X-direction. As the storage tray 300 moves relative to the storage bay 210 in the X-direction, the flat portions 360 of the storage tray 300 slide along the sloped surface 254 of a respective one of the protrusions 250 until reaching the flat top surface 252 of the protrusions 250, at which point the storage tray 300 is advantageously in a flat orientation (e.g. defining a plane perpendicular to gravity, g). The transport system 400 then continues to remove the storage tray 300 from the storage bay 210 by pulling on the movement feature 390, sliding the flat portions 360 along the flat top surface 252 of a respective one of the protrusions 250 until the flat portions 360 pass over the front wall(s) 230 at the front edge of the storage bay 210, at which point the storage tray 300 is considered to have been entirely removed from the storage bay 210.

Figure 15:
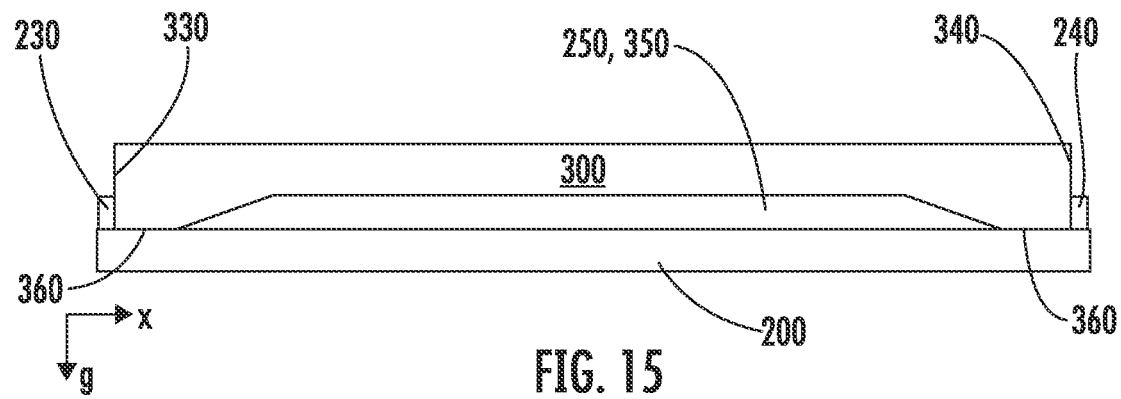
FIG. 15 is a schematic cross-sectional view of a storage tray contained within a storage bay of an ASRS.
Figure 16:
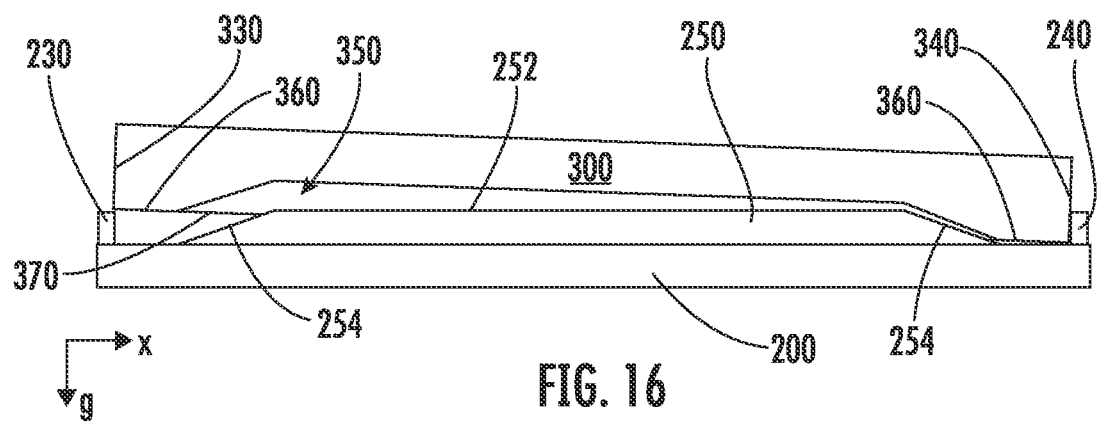
FIG. 16 is a schematic cross-sectional view of a storage tray in a first position relative to the storage bay.
Figure 17:
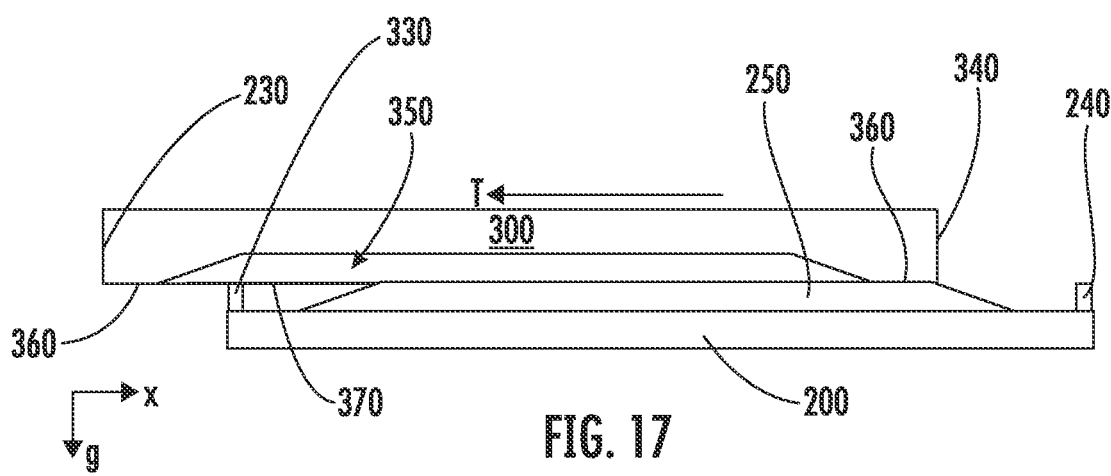
FIG. 17 is a schematic cross-sectional view of a storage tray in a second position relative to the storage bay.

An example of the removal process of a storage tray 300 from a storage bay 210 is illustrated schematically in FIGS. 15-17. FIG. 15 shows the storage tray 300 positioned within the storage bay 210 delimited by the front wall(s) 230, the rear wall(s) 240, and the dividers (220, not shown, since FIGS. 15-17 are cross-sectional views along a cut plane through a protrusion 250), with each protrusion 250 being engaged within a corresponding one of the recesses 350. FIG. 16 shows the front surface 330 of the storage tray 300 lifted vertically, such that the bottom-most edge to be positioned for passing over (e.g., be above) the top surface of the front wall(s) 230 at the front edge of the storage bay 210. Thus, as shown in FIG. 16, the storage tray 300 has pivoted in a clockwise direction about a contact point between the rear surface 340 of the storage tray 300 and the rear wall 240 from the position in which the storage tray 300 is fully engaged within the storage bay 210, as shown in FIG. 15. In FIG. 17, the storage tray 300 has moved, relative to the position of the storage tray 300 with respect to the storage bay 210 shown in FIG. 16, in both a translatory aspect in the direction T and in a rotary aspect in the anticlockwise direction, the rotary movement being about the bottom-most edge of the front surface 330 of the storage tray 300. Thus, in FIG. 17, the storage tray 300 is an orientation in which the bottom surface 370 thereof is oriented in a plane that is generally perpendicular (e.g., allowing for misalignments of up to 10°, up to 5°, up to 1°) to the direction of gravity g, such that the bottom surface 370 of the storage tray 300 slides along the front wall(s) 230 at the front edge of the storage bay 210 simultaneous to one of the flat portions 360 adjacent to (e.g., closest to) the rear surface 340 of the storage tray 300 sliding along first the sloped surface 254 and then the flat top surface 252 of one of the protrusions 250 as the storage tray 300 moves from the position shown in FIG. 16 to the position shown in FIG. 17. During an initial movement phase of the storage tray 300 between the position shown in FIG. 16 and the position shown in FIG. 17, each of the flat portions 360 adjacent to (e.g., closest to) the front surface 330 of the storage tray 300 first moves over, generally in the direction T, a corresponding one of the front wall(s) 230 and is either spaced apart from (e.g., does not touch) such front wall 230 or is in contact with (e.g., direct contact with) such front wall 230 while the storage tray 300 moves in the direction T.

As disclosed herein, the storage tray 300 is any suitably-shaped structure for containing one or more items positioned thereon. The storage tray 300 is configured to be securely confined (e.g., held, in a removable manner) within a storage bay 210 (e.g., any designated storage location, such as on a designated position on a shelf 200) of an automated storage and retrieval system. When positioned within the storage bay (e.g., as shown in FIG. 15), the storage tray 300 is restrained from moving in the Y- and/or X-directions without a corresponding movement of at least a portion of the storage tray in the direction perpendicular to the X-Y plane. However, the positional restraint of the storage tray 300 within a storage bay 210 is configured to be "unlocked" by engagement of the transport system 400 with one of the movement features 390 of the storage tray 300 (e.g., as shown in FIG. 16). The transport system 400 is advantageously autonomously operable to secure the storage tray 300 within a designated storage bay 210 of the automated storage and retrieval system and/or to remove the storage tray 300 from the storage bay 210 for transport within the automated storage and retrieval system, including for delivery of the contents of the storage tray 300 to an authorized recipient at an external access point of the automated storage and retrieval system.

The storage tray 300 is restrained (e.g., positionally "locked" in the X-Y plane) within the storage bay 210 using the force of gravity g, with the front wall(s) 230 and the rear wall(s) 240 of the storage bay 210 being provided to resist and/or restrict motion of the storage tray 300 relative to the storage bay 210 in the X-direction, the dividers 220 on opposite lateral sides of the storage bay 210 being provided to resist and/or restrict motion of the storage tray 300 in the Y-direction, and the gravity force g acting on the storage tray 300 to resist and/or restrict vertical movements of the storage tray 300 relative to the storage bay 210, thereby exerting a force on the storage tray 300 to maintain contact (e.g., direct contact) between the storage tray 300 and the upper surface of the shelf 200 within the storage bay 210.

The positional locking, or movement restriction, features of the storage tray 300 (e.g., at least the front and rear surfaces 330, 340 and the recesses 350) are configured to engage with the positional locking, or movement restriction, features of the storage bay 210 (e.g., at least the front and rear walls 230, 240 and the protrusions 250) to resist a displacement movement of the storage tray 300 from the storage bay 210 while the storage tray 300 is being stored within the automated storage and retrieval system and not being engaged by the transport system 400. Thus, relative movement of the storage tray 300 relative to the storage bay 210 in which such storage tray 300 is deposited for storage is restricted in all directions, such that displacement movements imparted to the storage tray 300 are resisted. Such displacement movements can be imparted, for example and without limitation, in the event of transportation and/or movement of the entire automated storage and retrieval system, areas of human interaction, non-level operation, or any other situation wherein the storage tray 300 may be acted upon by an external force that could cause displacement of the storage tray 300 relative to the storage bay 210 within the automated storage and retrieval system from the desired, specified, or last known position (e.g., the designated storage bay 210, as may be designated by a controller for the automated storage and retrieval system).

In some embodiments, depositing the storage tray 300 into a designated storage bay 210 comprises using the transport system 400 to align the storage tray 300 (e.g., vertically) with the shelf 200 on which the designated storage bay 210 is located, such that the bottom surface 370 of the storage tray 300 is aligned with (e.g., above or coplanar with) the top surface of at least the front wall(s) 230 of the designated storage bay 210. Before, at the same time as, or subsequent to the storage tray 300 being sufficiently vertically aligned with the designated bay 210 by the transport system 400, the transport system 400 is also configured to align the storage tray 300 with the designated storage bay 210 in the Y-direction, in which case a centerline of the storage tray 300 extending in the X-direction and a centerline of the storage bay, also extending in the X-direction, are substantially coaxial with each other. Stated somewhat differently, in aligning the storage tray 300 with the designated storage bay 210 in the Y-direction, the storage tray 300 is positioned such that each recess 350 thereof is aligned with a corresponding one of the protrusions 250 in the designated storage bay 210, such that when the storage tray 300 is moved in the X-direction for depositing within the designated storage bay, each protrusion 250 of the designated storage bay 210 engages within a corresponding one of the recesses 350 of the storage tray 300.

After the storage tray 300 is sufficiently vertically and laterally aligned, using the transport system 400, with the designated storage bay 210, the transport system 400 is then configured to, by engagement with the one or both of the movement features 390 (e.g., at least the movement feature 390 closest to the front surface 330 of the storage tray 300) of the storage tray 300, move the storage tray 300 in the X-direction so that the storage tray 300 is transferred from the transport system 300 onto the shelf 200 and into the designated storage bay 210. In transferring the storage tray 300 into the designated storage bay 210, the transport system 400 moves the storage tray 300 so that the rear surface 340 of the storage tray 300, as well as the flat portions 360 adjacent to the rear surface 340, pass vertically over the front wall(s) 230 at the front edge of the storage bay 210, such that the bottom surface 370 moves (e.g., slides, such as in direct contact) over the front wall(s) 230 and the flat portions 360 adjacent to the rear surface 340 slide along the flat top surface 252 of a corresponding one of the protrusions 250 while the storage tray 300 moves in the X-direction towards the rear wall(s) 240 of the designated storage bay 210.

As the storage tray 300 continues to move in the X-direction, the flat portions 360 adjacent to the rear surface 340 reach the end of the flat top surface 252 of the protrusion 250 against which such flat portion 360 has slid along, such that, as the movement of the storage tray 300 in the X-direction continues, the flat portion 360 in contact with each protrusion 250 transitions from the flat top surface 252 of the protrusion 250 to instead slide along the sloped surface 254 of the protrusion 250 that is closest to the rear wall(s) 240 of the storage bay 210. As each flat portion 360 slides along the sloped surface 254 of the corresponding protrusion 250, the storage tray 300 pivots in the clockwise direction about the point where the bottom surface 370 of the storage tray 300 contacts the top surface of the front wall(s) 230 simultaneously as the entire storage tray 300 continues to move in the X-direction towards the rear wall(s) 240. This pivoting movement of the storage tray 300 in the clockwise direction continues until the flat portions 360 contact the upper surface of the shelf 200 within the storage bay 210 (e.g., when the flat portions 360 are no longer sliding along the sloping portion of the protrusions 250 nearest the rear wall(s) 240), at which point the storage tray 300 continues moving towards the rear wall(s) 240 in the X-direction and the pivoting movement of the storage tray 300 stops or reverses (e.g., to pivot slightly in the anticlockwise direction about the same pivot point). It should be noted that, since the contact point of the bottom surface 370 on the top surface of the front wall(s) 230 changes as the storage tray 300 moves in the X-direction, the pivot point of the storage tray 370 changes as the point where the bottom surface 370 contacts the top surface of the front wall(s) 230 changes.

The transport system 400 continues to move the storage tray 300 until the rear surface of the storage tray 300 reaches (e.g., contacts directly, or is adjacent to) the rear wall(s) 240 at the rear edge of the designated storage bay 210, at which point the transport system 400 lowers (e.g., vertically) the front surface 330 of the storage tray 300 towards the upper surface of the shelf 200, such that each protrusion 250 is positioned within a corresponding one of the recesses 350 formed in the lateral edges of the storage tray 300. As the front surface 330 is lowered by the transport system 400, the storage tray 300 pivots about the point of contact where the rear surface 340 is in contact with the rear wall(s) 240 and/or the upper surface of the shelf 200. The front surface 330 is lowered by the transport system 400 until the flat portions 360 adjacent to the front wall(s) 230 and the flat portions adjacent to the rear wall(s) 240 are each against the upper surface of the shelf 200, such that the front and rear walls 230, 240 at the front and rear edges of the designated storage bay 210 restrict and/or resist any movement of the storage tray 300 in the X-direction beyond such front and rear walls 340, respectively, without the storage tray 300 being vertically displaced (e.g., moved) to pass over the front or rear walls 230, 240. In such position, the storage tray 300 is substantially positionally locked within the designated storage bay 210 on the shelf 200 in the X-Y plane.

The protrusions 250 are advantageously installed on both lateral sides of the storage bay 210 and are configured to raise the free end of the storage tray 300 (e.g., the end of the storage tray 300 that is opposite from the end where the transport system 400 is engaged with one of the movement features 390 of the storage tray 300) when the storage tray 300 is being loaded onto the transport system 400 (e.g., by removing the storage tray 300 from the storage bay 210 in which such storage bay 300 had been positioned), which requires, in some embodiments, the storage tray 300 to be substantially level (e.g., coplanar with the X-Y plane, which is perpendicular to gravity g) to complete the loading process of the storage tray 300 onto the transport system 400 from the storage bay 210. The protrusions 250 are also configured to allow such free end of the storage tray 300 (e.g., the end of the storage tray 300 that is opposite from the end where the transport system 400 is engaged with one of the movement features 390 of the storage tray 300) to pass over the top surface (e.g., defined in the direction opposite the direction of gravity g) of the front wall(s) 230 of the storage bay 210 as the storage tray 300 transitions onto the transport system 400 for transport elsewhere within the automated storage and retrieval system.

According to an example embodiment, a self-locking assembly is provided, the self-locking assembly comprising: one or more shelves comprising dividers to define storage bays that are adjacent to each other in a lateral direction, and a lock contained within each storage bay; and one or more storage units having a width that is a same as, or smaller than, a width of at least one of the storage bays, each of the one or more storage units comprising an upper surface configured to transport one or more items supported thereon, and an interlocking feature configured to engage with the lock of one of the storage bays to resist removal of each storage unit from a corresponding one of the storage bays; wherein each storage unit is configured for insertion within and removal from a corresponding one of the storage bays in a longitudinal direction.

In some or all embodiments of the self-locking assembly, the lock comprises a protrusion installed adjacent to and, optionally, in contact with, one of the dividers, each protrusion extending within a corresponding storage bay in which the protrusion is installed in the longitudinal direction.

In some or all embodiments of the self-locking assembly, the interlocking feature comprises a recess formed on a lateral edge of the storage unit, the recess having a substantially similar shape to the protrusion, so that the protrusion is configured to fit, partially or entirely, within the recess.

In some or all embodiments of the self-locking assembly, the protrusion is a first protrusion; each lock comprises a second protrusion, which is installed adjacent to and, optionally, in contact with, one of the dividers on an opposite side of each storage bay from the first protrusion; the recess is a first recess; and the interlocking feature comprises a second recess formed on a lateral edge of the storage unit, the second recess having a substantially similar shape to the second protrusion, so that the second protrusion is configured to fit within the second recess.

In some or all embodiments of the self-locking assembly, each storage bay comprises, at a front and/or rear edge thereof as defined in the longitudinal direction, one or more vertical walls to resist a movement of any storage unit, relative to the storage bay, in a longitudinal direction when the interlocking feature is engaged with the lock, unless the storage bay is lifted vertically over the one or more vertical walls at least at the front edge of the storage bay.

In some or all embodiments of the self-locking assembly, the first and second protrusions each have a substantially planar top surface having a height that is substantially similar to a height of the one or more vertical walls.

In some or all embodiments of the self-locking assembly, each of the first and second protrusions comprise a sloped surface at a rear edge thereof.

In some or all embodiments, the self-locking assembly comprises a transport system configured to deposit one of the storage units within a corresponding one of the storage bays and to remove one of the storage units from the corresponding one of the storage bays, wherein each storage unit comprises a movement feature configured to be engaged by the transport system for depositing or removing one of the storage units from the corresponding one of the storage bays.

In some or all embodiments of the self-locking assembly, the transport system is configured such that, when depositing one of the storage units within one of the storage bays, a bottom surface of the storage unit is at a height above, or a same as, the height of the one or more vertical walls at the front edge of the storage bay, such that the bottom surface of the storage unit is in sliding contact with the top surface of each of the first and second protrusions as the storage unit is deposited into the corresponding storage bay.

In some or all embodiments of the self-locking assembly, the bottom surface of the storage unit is configured to slide down the sloped surface of each of the first and second protrusions, such that the bottom surface of the storage unit is at a height below the one or more vertical walls at the front and/or rear edges of the storage bay.

In some or all embodiments of the self-locking assembly, when depositing one of the storage units within the storage bay and after a front edge of the storage unit has passed over the one or more vertical walls at the front edge of the storage bay, the transport system is configured to lower the front edge of the storage unit such that substantially all of the first and second recesses are occupied by at least portions of the first and second protrusions, respectively.

In some or all embodiments of the self-locking assembly, the transport system is configured, when removing one of the storage units from one of the storage bays, to engage with the movement feature to lift a front edge of the bottom surface of the storage unit to a height above, or a same as, the height of the one or more vertical walls at the front edge of the storage bay, and to pull the storage unit out of the storage bay.

In some or all embodiments of the self-locking assembly, during removal of the storage unit from the storage bay, the storage unit is configured to slide along the sloped surface of the first and second protrusions until the bottom surface of the storage unit is at a height that is greater than, or a same as, the height of the one or more walls at the front edge of the storage bay.

In some or all embodiments of the self-locking assembly, each storage unit comprises a wall extending vertically upward from the upper surface to resist items positioned on the upper surface from sliding off of the storage unit.

In some or all embodiments of the self-locking assembly, the lateral direction is substantially orthogonal to the lateral direction, and wherein a gravity vector is substantially orthogonal to both the lateral direction and the longitudinal direction.

According to another example embodiment, a conveyance comprising at least one self-locking assembly according to any of the example embodiments provided herein is provided. In some aspects, the conveyance is a motor vehicle. In some aspects, the motor vehicle is a truck for delivering parcels, packages, and/or mail.

According to another example embodiment, a method of securing a storage unit within a storage bay is provided, the method comprising: providing one or more shelves, each of which comprises dividers to define storage bays that are adjacent to each other in a lateral direction, and a lock contained within each storage bay; providing one or more storage units having a width that is a same as, or smaller than, a width of at least one of the storage bays, each of the one or more storage units comprising an upper surface for transporting one or more items supported thereon, and an interlocking feature that engages with the lock of one of the storage bays to resist removal of each storage unit from a corresponding one of the storage bays; and moving one of the storage units into and/or out of a corresponding one of the storage bays in a longitudinal direction.

In some or all embodiments of the method, the lock comprises a protrusion installed adjacent to and, optionally, in contact with, one of the dividers, each protrusion extending within a corresponding storage bay in which the protrusion is installed in the longitudinal direction.

In some or all embodiments of the method, the interlocking feature comprises a recess formed on a lateral edge of the storage unit, the recess having a substantially similar shape to the protrusion, so that the protrusion can fit, partially or entirely, within the recess.

In some or all embodiments of the method, the protrusion is a first protrusion; each lock comprises a second protrusion, which is installed adjacent to and, optionally, in contact with, one of the dividers on an opposite side of each storage bay from the first protrusion; the recess is a first recess; and the interlocking feature comprises a second recess formed on a lateral edge of the storage unit, the second recess having a substantially similar shape to the second protrusion, so that the second protrusion can fit, partially or entirely, within the second recess.

In some or all embodiments of the method, each storage bay comprises, at a front and/or rear edge thereof as defined in the longitudinal direction, one or more vertical walls to resist a movement of any storage unit, relative to the storage bay, in a longitudinal direction when the interlocking feature is engaged with the lock, unless the storage bay is lifted vertically over the one or more vertical walls at least at the front edge of the storage bay.

In some or all embodiments of the method, the first and second protrusions each have a substantially planar top surface having a height that is substantially similar to a height of the one or more vertical walls.

In some or all embodiments of the method, each of the first and second protrusions comprise a sloped surface at a rear edge thereof.

In some or all embodiments of the method, each storage unit comprises a movement feature; the method comprising engaging the movement feature with a transport system to deposit one of the storage units within a corresponding one of the storage bays and/or to remove one of the storage units from a corresponding one of the storage bays.

In some or all embodiments of the method, when depositing one of the storage units within one of the storage bays, a bottom surface of the storage unit is at a height above, or a same as, the height of the one or more vertical walls at the front edge of the storage bay, such that, as the storage unit is deposited within a corresponding one of the storage bays, the bottom surface of the storage unit is in sliding contact with the top surface of each of the first and second protrusions as the storage unit is deposited into the corresponding storage bay.

In some or all embodiments of the method, the bottom surface of the storage unit slides down the sloped surface of each of the first and second protrusions, such that the bottom surface of the storage unit is at a height below the one or more vertical walls at the front and/or rear edges of the storage bay.

In some or all embodiments of the method, when depositing one of the storage units within the storage bay and after a front edge of the storage unit has passed over the one or more vertical walls at the front edge of the storage bay, lowering, via the transport system, the front edge of the storage unit such that substantially all of the first and second recesses are occupied by at least portions of the first and second protrusions, respectively.

In some or all embodiments, the method comprises engaging the movement feature via the transport system, when removing one of the storage units from one of the storage bays, to lift a front edge of the bottom surface of the storage unit to a height above, or a same as, the height of the one or more vertical walls at the front edge of the storage bay, and pulling the storage unit out of the storage bay.

In some or all embodiments of the method, during removal of the storage unit from the storage bay, the storage unit slides along the sloped surface of the first and second protrusions until the bottom surface of the storage unit is at a height that is greater than, or a same as, the height of the one or more walls at the front edge of the storage bay.

In some or all embodiments of the method, each storage unit comprises a wall extending vertically upward from the upper surface to resist items positioned on the upper surface from sliding off of the storage unit.

In some or all embodiments of the method, the lateral direction is substantially orthogonal to the longitudinal direction, and wherein a gravity vector is substantially orthogonal to both the lateral direction and the longitudinal direction.

The invention claimed is:

1. A self-locking assembly comprising:
   one or more shelves comprising:
      dividers to define storage bays that are adjacent to each other in a lateral direction, wherein adjacent storage bays are spaced apart from each other by one of the dividers positioned therebetween; and
      a lock contained within each storage bay; and
   one or more storage units having a width that is a same as, or smaller than, a width of at least one of the storage bays, each of the one or more storage units comprising:
      an upper surface configured to transport one or more items supported thereon; and
      an interlocking feature configured to engage with the lock of one of the storage bays to resist removal of each storage unit from a corresponding one of the storage bays;
      wherein each storage unit is configured for insertion within and removal from a corresponding one of the storage bays in a longitudinal direction;
   wherein the lock comprises a protrusion installed adjacent to and in contact with one of the dividers, each protrusion extending within a corresponding storage bay in which the protrusion is installed in the longitudinal direction; and
   wherein the interlocking feature comprises a recess formed on a lateral edge of the storage unit, the recess having a substantially similar shape to the protrusion, so that the protrusion is configured to fit, partially or entirely, within the recess.

2. The self-locking assembly of claim 1, wherein:
   the protrusion is a first protrusion;
   each lock comprises a second protrusion, which is installed adjacent to and in contact with one of the dividers on an opposite side of each storage bay from the first protrusion;
   the recess is a first recess; and
   the interlocking feature comprises a second recess formed on a lateral edge of the storage unit, the second recess having a substantially similar shape to the second protrusion, so that the second protrusion is configured to fit, partially or entirely, within the second recess.

3. The self-locking assembly of claim 2, wherein each storage bay comprises, at a front and/or rear edge thereof as defined in the longitudinal direction, one or more front walls and/or rear walls, respectively, which are configured to resist a movement of any storage unit, relative to the storage bay, in the longitudinal direction when the interlocking feature is engaged with the lock, unless the storage bay is lifted vertically over the one or more front walls at the front edge of the storage bay.

4. The self-locking assembly of claim 3, wherein:
   the first and second protrusions each have a substantially planar top surface having a height that is the same as or higher than a height of the one or more vertical walls; and
   each of the first and second protrusions comprise a sloped surface at a rear edge thereof.

5. The self-locking assembly of claim 4, comprising a transport system configured to:
   deposit one of the storage units within a corresponding one of the storage bays; and
   remove one of the storage units from the corresponding one of the storage bays;
   wherein each storage unit comprises a movement feature configured for engagement with the transport system for depositing or removing one of the storage units from the corresponding one of the storage bays.

6. The self-locking assembly of claim 5, wherein the transport system is configured such that, when depositing one of the storage units within one of the storage bays, a bottom surface of the storage unit is at a height above, or a same as, the height of the one or more front walls at the front edge of the storage bay, such that the bottom surface of the storage unit is in sliding contact with the top surface of each of the first and second protrusions as the storage unit is deposited into the corresponding storage bay.

7. The self-locking assembly of claim 6, wherein:
   when one of the storage units is being deposited into one of the storage bays, the bottom surface of the storage unit is configured to slide down the sloped surface of each of the first and second protrusions, such that the bottom surface of the storage unit is at a height below the one or more front walls at the front edge of the storage bay; and/or
   when one of the storage units is being retrieved from one of the storage bays, the bottom surface of the storage unit is configured to slide up the sloped surface of each of the first and second protrusions, such that the bottom surface of the storage unit is at a same height as the one or more front walls at the front edge of the storage bay.

8. The self-locking assembly of claim 7, wherein the transport system is configured to:
   when depositing one of the storage units within the storage bay and after a front edge of the storage unit has passed over the one or more front walls at the front edge of the storage bay, lower the front edge of the storage unit such that substantially all of the first and second recesses are occupied by at least portions of the first and second protrusions, respectively; and
   when removing one of the storage units from one of the storage bays, engage with the movement feature to lift a front edge of the bottom surface of the storage unit to a height above, or a same as, the height of the one or more front walls at the front edge of the storage bay, and to pull the storage unit out of the storage bay.

9. The self-locking assembly of claim 1, wherein:
   each storage unit comprises a wall extending vertically upward from the upper surface to resist items positioned on the upper surface from sliding off of the storage unit; and/or
   the lateral direction is substantially orthogonal to the longitudinal direction, and wherein a gravity vector is substantially orthogonal to both the lateral direction and the longitudinal direction.

10. A conveyance comprising at least one self-locking assembly of claim 1.

11. The conveyance of claim 10, wherein the conveyance is a motor vehicle for delivering parcels, packages, and/or mail.

12. A method of securing a storage unit within a storage bay, the method comprising:
providing one or more shelves, each of which comprises:
dividers to define storage bays that are adjacent to each other in a lateral direction, wherein adjacent storage bays are spaced apart from each other by one of the dividers positioned therebetween; and
a lock contained within each storage bay;
providing one or more storage units having a width that is a same as, or smaller than, a width of at least one of the storage bays, each of the one or more storage units comprising:
an upper surface for transporting one or more items supported thereon; and
an interlocking feature that engages with the lock of one of the storage bays to resist removal of each storage unit from a corresponding one of the storage bays; and
moving one of the storage units into and/or out of a corresponding one of the storage bays in a longitudinal direction;
wherein the lock comprises a protrusion installed adjacent to and in contact with one of the dividers, each protrusion extending within a corresponding storage bay in which the protrusion is installed in the longitudinal direction; and
wherein the interlocking feature comprises a recess formed on a lateral edge of the storage unit, the recess having a substantially similar shape to the protrusion, so that the protrusion is configured to fit, partially or entirely, within the recess.

13. The method of claim 12, wherein:
the protrusion is a first protrusion;
each lock comprises a second protrusion, which is installed adjacent to and in contact with one of the dividers on an opposite side of each storage bay from the first protrusion;
the recess is a first recess; and
the interlocking feature comprises a second recess formed on a lateral edge of the storage unit, the second recess having a substantially similar shape to the second protrusion, so that the second protrusion can fit, partially or entirely, within the second recess.

14. The method of claim 13, wherein each storage bay comprises, at a front and/or rear edge thereof as defined in the longitudinal direction, one or more front walls and/or rear walls, respectively, which resist a movement of any storage unit, relative to the storage bay, in the longitudinal direction when the interlocking feature is engaged with the lock, unless the storage bay is lifted vertically over the one or more front walls at the front edge of the storage bay.

15. The method of claim 14, wherein:
the first and second protrusions each have a substantially planar top surface having a height that is substantially similar to a height of the one or more vertical walls; and
each of the first and second protrusions comprise a sloped surface at a rear edge thereof.

16. The method of claim 15, wherein each storage unit comprises a movement feature; the method comprising engaging the movement feature with a transport system to deposit one of the storage units within one of the storage bays and/or to remove one of the storage units from one of the storage bays.

17. The method of claim 16, wherein depositing one of the storage units within one of the storage bays comprises:
raising the storage tray such that a bottom surface thereof is at a height above, or a same as, the height of the one or more front walls at the front edge of the storage bay; and
as the storage unit is deposited within a corresponding one of the storage bays, sliding the bottom surface of the storage unit along the top surface of each of the first and second protrusions.

18. The method of claim 17, wherein:
depositing one of the storage units within one of the storage bays comprises sliding the bottom surface of the storage unit down the sloped surface of each of the first and second protrusions, such that the bottom surface of the storage unit is at a height below the one or more vertical walls at the front and/or rear edges of the storage bay; and/or
retrieving one of the storage units from one of the storage bays comprises sliding the bottom surface of the storage unit up the sloped surface of each of the first and second protrusions, such that the bottom surface of the storage unit is at a same height as the one or more front walls at the front edge of the storage bay.

19. The method of claim 18, wherein the transport system:
lowers, when depositing one of the storage units within the storage bay and after a front edge of the storage unit has passed over the one or more front walls at the front edge of the storage bay, the front edge of the storage unit such that substantially all of the first and second recesses are occupied by at least portions of the first and second protrusions, respectively; and
engages, when removing one of the storage units from one of the storage bays, with the movement feature to lift a front edge of the bottom surface of the storage unit to a height above, or a same as, the height of the one or more front walls at the front edge of the storage bay, and to pull the storage unit out of the storage bay.

20. The method of claim 12, wherein:
each storage unit comprises a wall extending vertically upward from the upper surface to resist items positioned on the upper surface from sliding off of the storage unit; and/or
the lateral direction is substantially orthogonal to the longitudinal direction, and wherein a gravity vector is substantially orthogonal to both the lateral direction and the longitudinal direction.

* * * * *